(12) United States Patent
Costello

(10) Patent No.: US 10,832,003 B2
(45) Date of Patent: Nov. 10, 2020

(54) METHOD AND SYSTEM FOR INTENT CLASSIFICATION

(71) Applicant: CloudMinds Technology, Inc., Santa Clara, CA (US)

(72) Inventor: Charles Costello, Palo Alto, CA (US)

(73) Assignee: CloudMinds Technology, Inc., Santa Clara, CA (US)

(*) Notice: Subject to any disclaimer, the term of this patent is extended or adjusted under 35 U.S.C. 154(b) by 188 days.

(21) Appl. No.: 16/112,742

(22) Filed: Aug. 26, 2018

(65) Prior Publication Data
US 2020/0065384 A1 Feb. 27, 2020

(51) Int. Cl.
*G06F 40/30* (2020.01)
*G06N 3/04* (2006.01)
*G06N 3/08* (2006.01)

(52) U.S. Cl.
CPC .......... *G06F 40/30* (2020.01); *G06N 3/04* (2013.01); *G06N 3/0445* (2013.01); *G06N 3/0454* (2013.01); *G06N 3/08* (2013.01)

(58) Field of Classification Search
CPC ........ G06F 40/30; G06N 3/04; G06N 3/0445; G06N 3/0454; G06N 3/08
USPC .......................................................... 704/9
See application file for complete search history.

(56) References Cited

U.S. PATENT DOCUMENTS

| | | | |
|---|---|---|---|
| 10,402,733 B1* | 9/2019 | Li | G06N 7/005 |
| 10,482,182 B1* | 11/2019 | Jankowski, Jr. | G06K 9/344 |
| 10,572,778 B1* | 2/2020 | Robinson | H04L 67/22 |
| 2013/0318016 A1* | 11/2013 | Hossain | G06N 20/00 706/13 |
| 2016/0307098 A1* | 10/2016 | Goel | G06N 3/0454 |
| 2017/0308802 A1* | 10/2017 | Ramsoy | G06N 20/20 |
| 2017/0357879 A1* | 12/2017 | Odaibo | A61B 3/14 |
| 2017/0372199 A1* | 12/2017 | Hakkani-Tur | G06N 3/08 |
| 2018/0033144 A1* | 2/2018 | Risman | G16H 30/20 |
| 2018/0089582 A1* | 3/2018 | Bouillet | G06N 5/003 |
| 2018/0174044 A1* | 6/2018 | Na | G06K 9/66 |
| 2018/0268244 A1* | 9/2018 | Moazzami | G06N 7/005 |
| 2018/0365529 A1* | 12/2018 | Duan | G06K 9/6274 |
| 2019/0043193 A1* | 2/2019 | Odaibo | G06K 9/00617 |
| 2019/0122077 A1* | 4/2019 | Tsishkou | G05D 1/0088 |
| 2019/0147355 A1* | 5/2019 | Rennie | G06N 5/046 706/47 |
| 2019/0156198 A1* | 5/2019 | Mars | G06N 20/00 |

(Continued)

*Primary Examiner* — Edwin S Leland, III
(74) *Attorney, Agent, or Firm* — Syncoda LLC; Feng Ma

(57) ABSTRACT

A computer-implemented intent classification method and system are provided. The method comprises: providing a plurality of trained model sets, each based on a different model and comprising a plurality of trained models, with each trained model in each trained model set obtained by training a same model with a different initialization condition over a pre-determined dataset; feeding an input text into each trained model to obtain a plurality of prediction results for indicating a likely intent class of the input text; ensembling prediction results corresponding to a same trained model set for each trained model set to obtain a plurality of first-layer ensembles; ensembling the plurality of first-layer ensembles to obtain at least one second-layer ensemble, each obtained by ensembling two or more first-layer ensembles; and determining the intent class of the input text based on the at least one second-layer ensemble.

20 Claims, 9 Drawing Sheets

(56) References Cited

U.S. PATENT DOCUMENTS

| | | | |
|---|---|---|---|
| 2019/0197395 A1* | 6/2019 | Kibune | G06N 3/082 |
| 2019/0311210 A1* | 10/2019 | Chatterjee | G06Q 30/02 |
| 2019/0313895 A1* | 10/2019 | Hayashi | G06T 7/0012 |
| 2019/0378006 A1* | 12/2019 | Fukuda | G06K 9/6293 |
| 2020/0050667 A1* | 2/2020 | Lin | G06F 40/30 |
| 2020/0065384 A1* | 2/2020 | Costello | G06N 3/0454 |
| 2020/0074997 A1* | 3/2020 | Jankowski, Jr. | G10L 21/0216 |
| 2020/0075044 A1* | 3/2020 | Jankowski, Jr. | G10L 21/0202 |
| 2020/0082165 A1* | 3/2020 | Wang | G06K 9/6223 |

\* cited by examiner

METHOD AND SYSTEM FOR INTENT CLASSIFICATION

TECHNICAL FIELD

The present disclosure relates generally to the field of natural language processing, specifically to semantic technologies, and more specifically to a method for intent classification and a system implementing the method.

BACKGROUND

Intent classification is a vital element of natural language understanding. Identifying intent is a semantic classification problem: the process of identifying the key context in a given query. Through the years, algorithms to identify intent have progressed from utilizing approaches such as parts-of-speech tags with domain information as features, simple pattern matching, and bag-of-words model to state-of-the-art deep learning algorithms.

Currently the deep learning models have been proved as effective algorithms to solve classification tasks in natural language processing. Among the many deep learning approaches that have been researched, two major deep learning variants have been widely studied and utilized for intent classification, which include convolutional neural networks (CNNs) and recurrent neural networks (RNNs). Although the CNNs based approaches are heavily used in computer vision tasks, they have also been adapted and proven successful on natural language processing (NLP) tasks. The RNNs based approaches have also worked well for intent classification.

However, due to the essentially statistical nature of all of the algorithms that have been developed for user intent classification, each of the above mentioned approaches suffers from misclassification of user intent.

SUMMARY OF THE INVENTION

Inventors of this present disclosure have realized that although deep learning models such as CNNs and RNNs have shown impressive performances on many NLP tasks, individual models are still susceptible to issues including overfitting and local optima. The underlying reason for the above noted limitation may reside in the fact that the performance of any single deep learning model is based on what it learns during training, which may not encompass all of the information in the dataset.

In order to specifically address the above issues associated with existing semantic technologies which typically utilize one single model for a NLP task such as intent classification, the present disclosure provides the follow technical solutions.

In a first aspect, the present disclosure provides a computer-implemented method for determining an intent class of an input text (i.e. method for intent classification, or short as intent classification method). The intent classification method comprises the following steps:

providing a plurality of trained model sets, wherein each of the plurality of trained model sets is based on a different model and comprises a plurality of trained models, wherein each of the plurality trained models in the each of the plurality of trained model sets is obtained by training a same model with a different initialization condition over a pre-determined dataset;

feeding the input text into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

ensembling prediction results corresponding to a same trained model set for each of the plurality of trained model sets to thereby obtain a plurality of first-layer ensembles corresponding respectively to the plurality of trained model sets;

ensembling the plurality of first-layer ensembles to thereby obtain at least one second-layer ensemble, wherein each of the at least one second-layer ensemble is obtained by ensembling two or more of the plurality of first-layer ensembles; and determining the intent class of the input text based on the at least one second-layer ensemble.

In the method described above, the step of providing a plurality of trained model sets can comprise the sub-steps of:
providing a plurality of models; and
training each of the plurality of models using data from the pre-determined dataset to thereby obtain the plurality of trained model sets.

According to some embodiments of the method, the plurality of models comprise at least one neural networks-based model.

Herein optionally, each trained model in each trained model set that is based on a neural networks-based model can be trained with different random initializations of weights.

In the embodiments of the method described above, the at least one neural networks-based model can comprise one or more convolutional neural networks-based models, each selected from CNN, CharCNN, ABiCNN, or ACharBiCNN.

Further according to some embodiments, the one or more convolutional neural networks-based models comprises ABiCNN.

In the embodiments of the method described above, the at least one neural networks-based model can comprise one or more recurrent neural networks-based models, each selected from GRU, CharGRU, BiGRU, and CharBiGRU, LSTM, CharLSTM, BiLSTM, or CharBiLSTM.

In the embodiments of the method described above, the at least one neural networks-based model can comprise at least one convolutional neural networks-based model and at least one recurrent neural networks-based model.

In the method described above, the pre-determined dataset can optionally be specific to a language whose characters contain rich semantic information, wherein each of the at least one neural networks-based model has character-level embeddings.

According to some embodiments of the method, the pre-determined dataset is ATIS, and the plurality of models comprise GRU, BiGRU, BiLSTM, CNN, CharCNN, ABiCNN, and ACharBiCNN.

According to some other embodiments of the method, the pre-determined dataset is Banking, and the plurality of models comprise CharGRU, CharLSTM, CharBiGRU, CharBiLSTM, CNN, CharCNN, ABiCNN, and ACharBiCNN.

According to yet some other embodiments of the method, the pre-determined dataset is SMP, and the plurality of models comprise CharLSTM, CharBiGRU, CharBiLSTM, CharCNN, ABiCNN, and ACharBiCNN.

In the method, one or both of the step of ensembling prediction results corresponding to a same trained model set for each of the plurality of trained model sets to thereby obtain a plurality of first-layer ensembles corresponding respectively to the plurality of trained model sets and the step of ensembling the plurality of first-layer ensembles to thereby obtain at least one second-layer ensemble, wherein each of the at least one second-layer ensemble is obtained by ensembling two or more of the plurality of first-layer ensembles can be performed under a majority vote with confidence approach.

In a second aspect, a system for determining an intent class of an input text is further provided. The system comprises a computer-readable memory storing executable instructions and one or more processors in communication with the computer-readable memory. The one or more processors are programmed by the executable instructions to at least:

feed the input text into each of a plurality trained models in each of a plurality of trained model sets to thereby obtain a plurality of prediction results, each indicating a likely intent class of the input text, wherein the plurality of prediction results correspond respectively to the plurality of trained models in the each of the plurality of trained model sets;

ensemble prediction results corresponding to a same trained model set for each of the plurality of trained model sets to thereby obtain a plurality of first-layer ensembles corresponding respectively to the plurality of trained model sets; and ensemble the plurality of first-layer ensembles to thereby obtain at least one second-layer ensemble, wherein each of the at least one second-layer ensemble is obtained by ensembling two or more of the plurality of first-layer ensembles.

According to some embodiments of the system, the one or more processors are programmed by the executable instructions to further train each of a plurality of models using data from a pre-determined dataset to thereby obtain the plurality of trained model sets, wherein each of the plurality of trained model sets is based on a different model, and each of the plurality trained models in the each of the plurality of trained model sets is based on a same model with a different initialization condition.

Herein, each of the plurality of models can be a neural networks-based model, and the different initialization condition can comprise different random initialization of weights.

Furthermore, the neural networks-based model can be a convolutional neural networks-based model or a recurrent neural networks-based model.

According to some embodiments of the system, the one or more processors are programmed by the executable instructions to further convert an input data into the input text.

In a third aspect, the present disclosure further provides a computer-implemented process or method for identifying one or a combination of models for an intent classification method with favorable accuracy based on a dataset. The process or the method comprises the following steps:

providing a plurality of models;

training each of the plurality of models using data from a train set of the dataset to thereby obtain a plurality of trained model sets, wherein each of the plurality of trained model sets is based on a different model and comprises a plurality of trained models, wherein each of the plurality trained models in the each of the plurality of trained model sets is obtained by training a same model with a different initialization condition over the dataset;

feeding an input text in a test set of the dataset into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

ensembling prediction results corresponding to a same trained model set for each of the plurality of trained model sets to thereby obtain a plurality of first-layer ensembles corresponding respectively to the plurality of trained model sets;

ensembling the plurality of first-layer ensembles to thereby obtain a plurality of second-layer ensembles, wherein each of the plurality of second-layer ensembles is obtained by ensembling one of all possible combinations among the plurality of first-layer ensembles;

evaluating each of the plurality of first-layer ensembles and each of the plurality of second-layer ensembles using pre-determined labels from the test set; and comparing a metric corresponding to each of the plurality of first-layer ensembles and each of the plurality of second-layer ensembles, and identifying the one or the combination of the models for the intent classification method if the one or the combination of the models implicated in one of the plurality of first-layer ensembles or the plurality of second-layer ensembles has a most favorable metric compared with others.

Herein optionally, the metric can comprise an unweighted F1 score.

The following are noted.

Throughout the disclosure, each of the terms "portion", "layer", "module", and alike, is referred to as a computer-implemented functional entity, which can comprise at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure. In addition, each of the "portion", "layer", "module", and alike, may be a general computer having the software program, or can be a hardware computing device specifically designed for such a task. The computer and the hardware computing device can be locally arranged, or can be remotely arranged, such as on an intranet, an internet, or in a cloud.

Throughout the disclosure, each of a method, a step, a sub-step, and a process, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

Throughout the disclosure, unless indicated otherwise, the terms "class" and "category" shall be interpreted as interchangeable.

BRIEF DESCRIPTION OF DRAWINGS

To more clearly illustrate some of the embodiments disclosed herein, the following is a brief description of drawings. The drawings in the following descriptions are only illustrative of some embodiments. For those of ordinary skill in the art, other drawings of other embodiments can become apparent based on these drawings.

DETAILED DESCRIPTION OF DRAWINGS

In the following, with reference to the above mentioned drawings of various embodiments disclosed herein, the technical solutions of the various embodiments of the disclosure will be described in a clear and fully understandable way.

It is noted that the described embodiments are merely a portion, but not all, of the embodiments of the disclosure. Based on the described embodiments of the disclosure, those ordinarily skilled in the art can obtain other embodiment(s), which shall come within the scope sought for protection by the disclosure.

In a first aspect, the present disclosure provides a system for determining a class of an input data (i.e. an intent classification system).

Figure 1A:
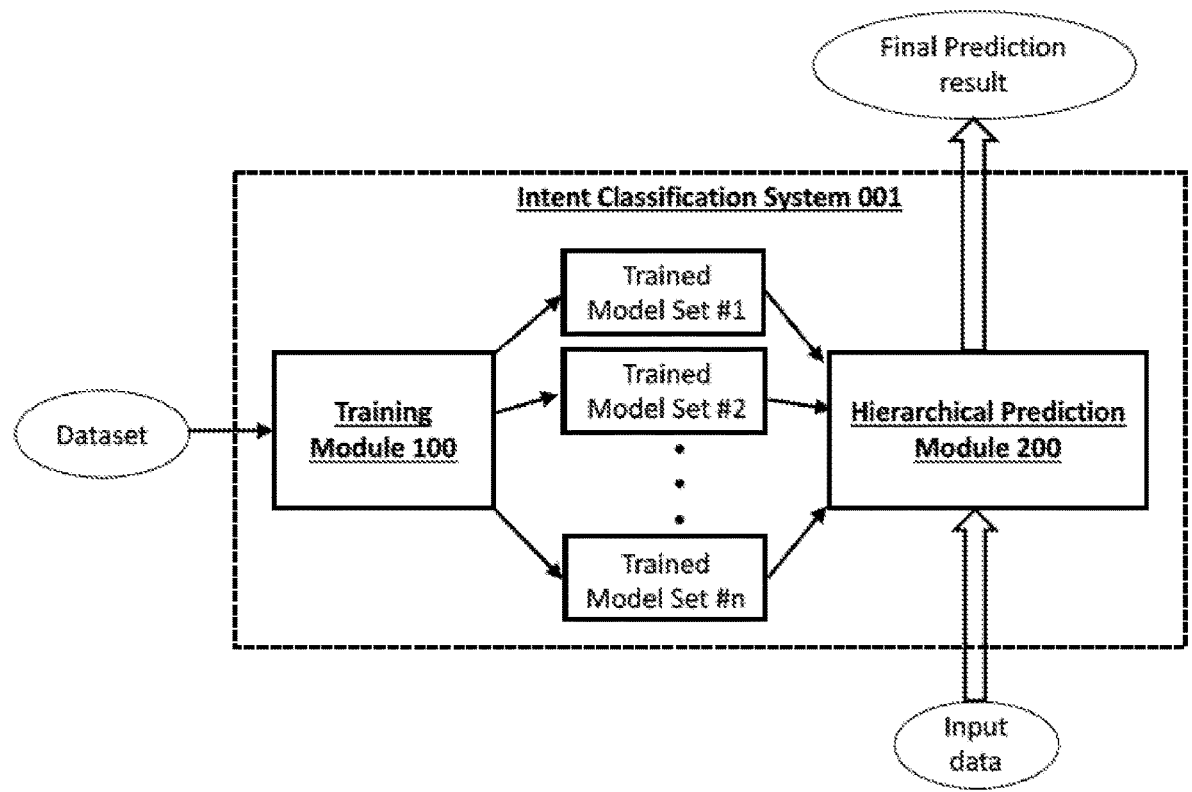
FIG. 1A illustrates a block diagram of an intent classification system according to some embodiments of the disclosure.

FIG. 1A illustrates a block diagram of an intent classification system according to some embodiments of the disclosure. As shown in FIG. 1A, the intent classification system 001 includes a training module 100 and a hierarchical prediction module 200.

The training module 100 is configured to use data from a dataset to train a plurality of models (i.e., Model #1, Model #2, . . . , and Model # n, where n is an integer ≥2) to thereby correspondingly obtain a plurality of trained model sets (i.e. Trained Model Set #1, Trained Model Set #2, . . . , and Trained Model Set # n), which are further employed by the hierarchical prediction module 200.

The hierarchical prediction module 200 is configured, upon receiving an input data, to utilize the plurality of trained model sets obtained from the training module 100, to make a prediction of what intent class the input data likely belong to, and then to output a final prediction result.

The following are noted.

The dataset can be a historical dataset that contains pre-collected sentences with pre-labelled classifications/categories, and the dataset can be specific to any languages including English, Chinese, Spanish, etc. Herein, the term "pre-collected" and "pre-labelled" are referred to as a situation where the sentences are collected beforehand, and the classifications/categories corresponding to each sentence is also labelled beforehand. Examples of the dataset include, but are not limited to, the ATIS (Airline Travel Information System) dataset, the proprietary banking dataset (short as Banking here after), the Chinese domain classification dataset SMP2017ECDT (short as SMP hereafter). Details of these above datasets will be provided in the following section of the disclosure, whose description is skipped herein.

Each of the plurality of models can be based on any machine learning algorithm, such as a deep neural networks-based model. Examples of a deep neural networks-based model includes convolutional neural networks-based models, recurrent neural networks-base models, and their respectively variants appropriate for the NLP task.

According to some embodiments of the disclosure, the plurality of models include at least one convolutional neural networks-based model, each optionally using character-level embeddings, being attention-based, and/or using a bidirectional architecture.

As such, each of the least one convolutional neural networks-based model can be a baseline convolutional neural network model with four interleaved layers of convolution and pooling (short as CNN hereafter), a character-level convolutional neural network model (short as CharCNN hereafter), an attention based bidirectional convolutional neural network model (short as ABiCNN hereafter), or a character-level attentive bidirectional convolutional neural network model (short as ACharBiCNN hereafter). Details of these above mentioned convolutional neural networks-based models (i.e. CNN, CharCNN, ABiCNN, and ACharBiCNN) will be provided in the following section of the disclosure, whose description is skipped herein.

According to some embodiments of the disclosure, the plurality of models include at least one recurrent neural networks-based model. Each of the at least one recurrent neural networks-based model can optionally use a Long Short-Term Memory (LSTM) cell architecture and/or a Gated Recurrent Unit (GRU) cell architecture, and can also optionally use character embeddings and/or a bidirectional architecture.

As such, each of the at least one recurrent neural networks-based model can be a baseline GRU cell-based recurrent neural network model (short as GRU hereafter), a character-level GRU cell-based recurrent neural network model (short as CharGRU hereafter), a bidirectional GRU cell-based recurrent neural network model (short as BiGRU hereafter), or a character-level bidirectional GRU cell-based recurrent neural network model (short as CharBiGRU). Each of the at least one recurrent neural networks-based model can also be a baseline LSTM cell-based recurrent neural network model (short as LSTM hereafter), a character-level LSTM cell-based recurrent neural network model (short as CharLSTM hereafter), a bidirectional LSTM cell-based recurrent neural network model (short as BiLSTM hereafter), or a character-level bidirectional LSTM cell-based recurrent neural network model (short as CharBiLSTM). Details of these above mentioned recurrent neural networks-based models (i.e. GRU, CharGRU, BiGRU, and CharBiGRU, LSTM, CharLSTM, BiLSTM, and CharBiLSTM) will be provided in the following section of the disclosure, whose description is skipped herein.

It is noted that these above convolutional networks-based models and recurrent neural networks-based models serve as illustrating examples only, and shall not be interpreted as limiting the scope of the disclosure. Any machine learning classifier (i.e. machine learning model) in a general sense can be actually applied. Herein, the machine learning classifier can be a deep learning classifier (e.g. multi-layer perceptron/deep neural networks, as well as CNNs and RNNs), or can be a non-deep learning machine learning classifier (e.g. logistic regression, support vector machines (SVMs), and naive Bayes, etc.).

The input data to be received by the hierarchical prediction module 200 in the intent classification system 001 disclosed herein can be in the form of text, comprising a single word or any practical number of words, which is compatible with, and thus can be directly taken for the prediction task by, the hierarchical prediction module 200 in the system.

The input data can also be in a form incompatible with the hierarchical prediction module 200, such as in the form of a speech utterance, which needs to be transformed as text. As such, according to some embodiments illustrated in FIG. 1B, the intent classification system 001 further includes an input processing module 300 configured to transform the input data into an input text, which is further sent to the hierarchical prediction module 200 for prediction.

In one specific implementation, the input data is in a form of a speech utterance, and the input processing module 300 comprises a speech recognizer (not shown in the drawings), configured to convert the input utterance into the input text.

In another implementation, the input data is in a form of a character in an image, and the input processing module 300 comprises an optical character recognizer (not shown in the drawings), configured to convert the image character into the input text.

The final prediction result to be outputted by the hierarchical prediction module 200 in the intent classification system 001 disclosed herein can include a class (or an identifier/label thereof) to which the input data most likely belongs. Note that instead of a single result such as a class, in alternative embodiments it is straightforward for the hierarchical prediction module 200 to return a result set comprising a list of one or more results, e.g., with probability or other associated data with each result. In one illustrating example, multiple classes with highest probabilities close to one another can be obtained in the result set.

Figure 1B:
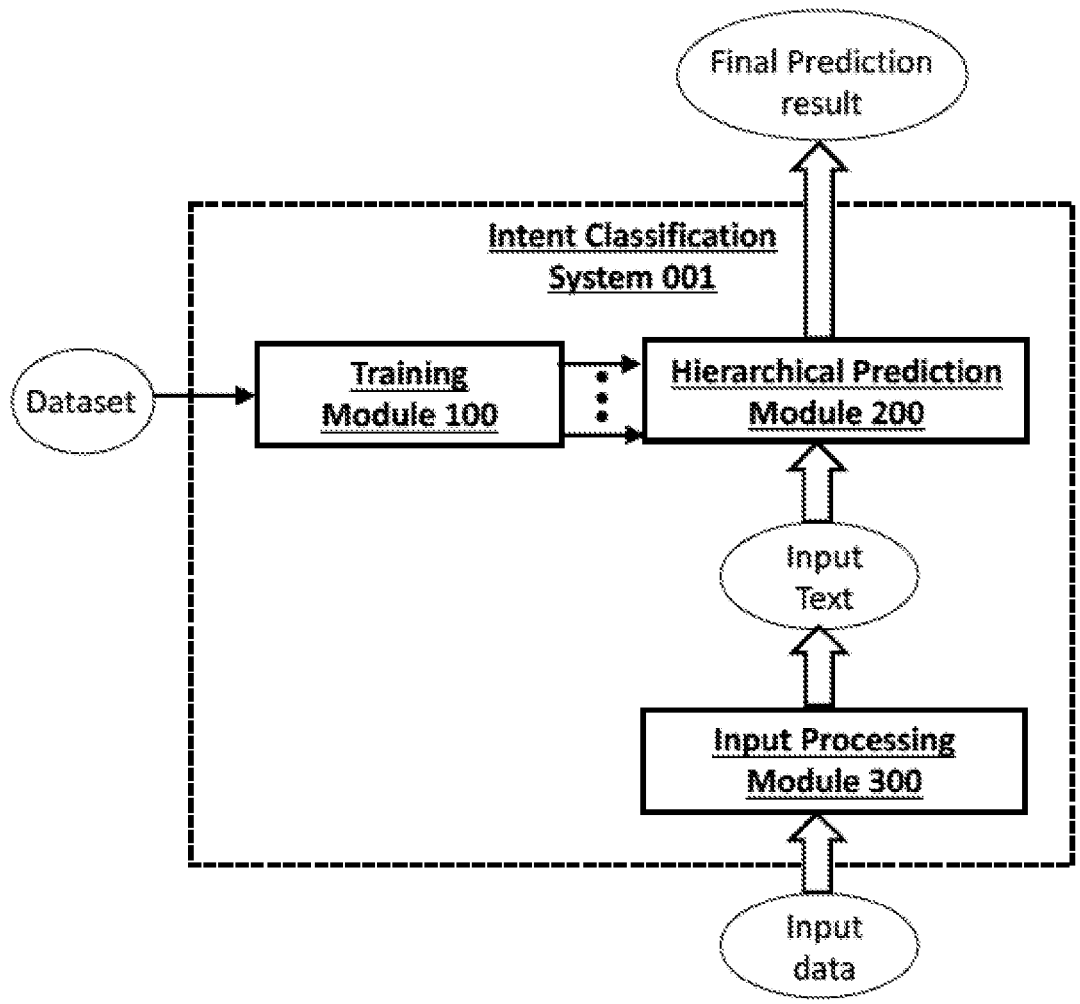
FIG. 1B illustrates a block diagram of an intent classification system according to some other embodiments of the disclosure.
Figure 2:
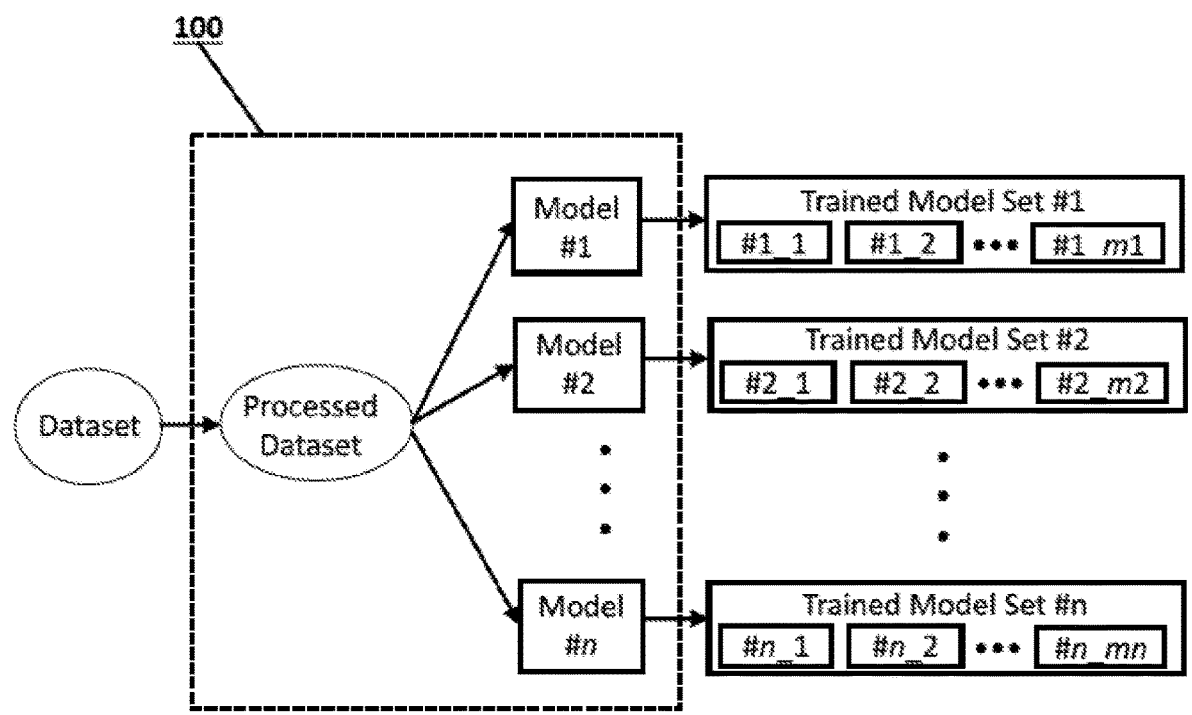
FIG. 2 illustrates a working process of a training module of the intent classification system shown in FIG. 1A and FIG. 1B according to some embodiments of the disclosure.

FIG. 2 illustrates a working process of a training module 100 of the intent classification system 001 shown in FIG. 1A and FIG. 1B according to some embodiments of the disclosure. As shown in FIG. 2, upon receiving the data from the dataset, the training module 100 processes the data to allow the dataset to be usable for the purpose of model training, and it can be realized by a dataset processing portion (not shown in the drawings) in the training module 100 of the intent classification system 001. Yet it is noted that the dataset processing portion is optional for the training module 100, and it can be outside of the training module 100, or even provided as an third party software program outside of the intent classification system 001. In these embodiments of the intent classification system 001, the dataset needs to be processed before being inputted to the training module 100.

After the data in the dataset is processed, the processed dataset is then fed into each of the plurality of models (illustrated as "Model #1", "Model #2", . . . , "Model # n" in the figure, where n is an integer ≥2) for training to thereby obtain a plurality of trained model sets, corresponding respectively to the plurality of models (illustrated as "Trained Model Set #1", "Trained Model Set #2", . . . , "Trained Model Set # n" in the figure). Each of the plurality of trained model set thereby obtained contains at least one trained model, each with a different initialization condition. In other word, under the action of the training module 100, each of the plurality of models is trained for a total of m times (m≥1), each time with a different initialization condition, to thereby obtain a total of m trained models which together form a trained model set corresponding to the each of the plurality of models.

For example, for Model #1, after training using the training module 100, a corresponding trained model set #1 including Trained Model #1_1, #1_2, . . . , and #1_m1 is obtained, where m1 is an integer ≥1. For Model #2, after training using the training module 100, a corresponding trained model set including Trained Model #2_1, #2_2, . . . , and #2_m2 is obtained, where m2 is an integer ≥1. For Model # n, after training using the training module 100, a corresponding trained model set including Trained Model # n_1, # n_2, . . . , and # n_mn is obtained, where mn is an integer ≥1. Herein each of the m1, m2, . . . , mn can be same or different.

It is noted that according to some preferred embodiments, each of the plurality of trained model sets includes more than one trained model (i.e. m≥2), which allows the subsequent first-layer ensembling of prediction results regarding the most likely intent class for a given input text which are each based on one of the more than one trained model included in a trained model set corresponding to a particular model. The first-layer ensembling of a single model with different initialization conditions can increase the prediction performance of the model than with only one random initialization of the weights.

It is also noted that according to some other embodiments, one of the plurality of trained model sets can include only one trained model (i.e. m=1), which can be taken arbitrarily as the first-layer ensembled prediction result by the computer without actual ensembling.

The different initialization condition can vary based on different embodiments. In embodiments where a given model is neural networks-based, the model is trained with same hyperparameters but with different random initializations for weights to thereby obtain a corresponding trained model set comprising at least one trained model. The at least one trained model in the trained model set thus corresponds respectively to a different initialization condition but together the trained model set correspond to the same model.

In one illustrating example which will be further described below and shown in FIG. 5, the plurality of models employed by the intent classification system 001 include the CNN model, the GRU model, and the ABiCNN model, among others. After training over each of the plurality of models in the training module 100, a plurality of trained model sets are obtained to correspond respectively to the plurality of models, and each trained model set includes a total of three trained models, each with same hyperparameters but a different random initialization for the weights. For example, training over the CNN model produces a trained CNN model set that includes a total of three trained CNN models (denoted as CNN_1, CNN_2, and CNN_3 in the figure). These individual trained model for each of the plurality of trained model sets are then employed by the hierarchical prediction module 200 of the intent classification system 001 to make predictions based on the input data.

It is noted that if a non-deep learning machine learning classifier is employed, it will have slightly different parameters that would be randomly initializations during first-layer ensembling (deep learning models randomly initialize weights). For example, logistic regression and support vector machine could randomly initialize the C/lambda parameter, while the naive Bayes would randomly initialize the priors.

It is noted that training of each of the plurality of models can be specifically performed using standard backpropagation techniques, and a typical machine learning scheme can be used for the training of each of the plurality of models. For example, in one embodiment, the processed dataset can be split into a training set and a test set, whereas the training set is used for training a model in a training phase, the test set is used in a testing phase for evaluating the model obtained in the training phase. The process for training each of the plurality of models is commonly known to people of ordinary skills in the field, whose detailed description is skipped herein for concision.

Herein, it is noted that each of the plurality of models can be pre-established, or can be newly developed utilizing a developing portion (not shown in the drawings) in the training module 100. Each model can be coded using an appropriate programming language and an appropriate framework. In one illustrating yet non-limiting example, each of the plurality of models is developed using the Python programming language and the TensorFlow framework.

Figure 3:
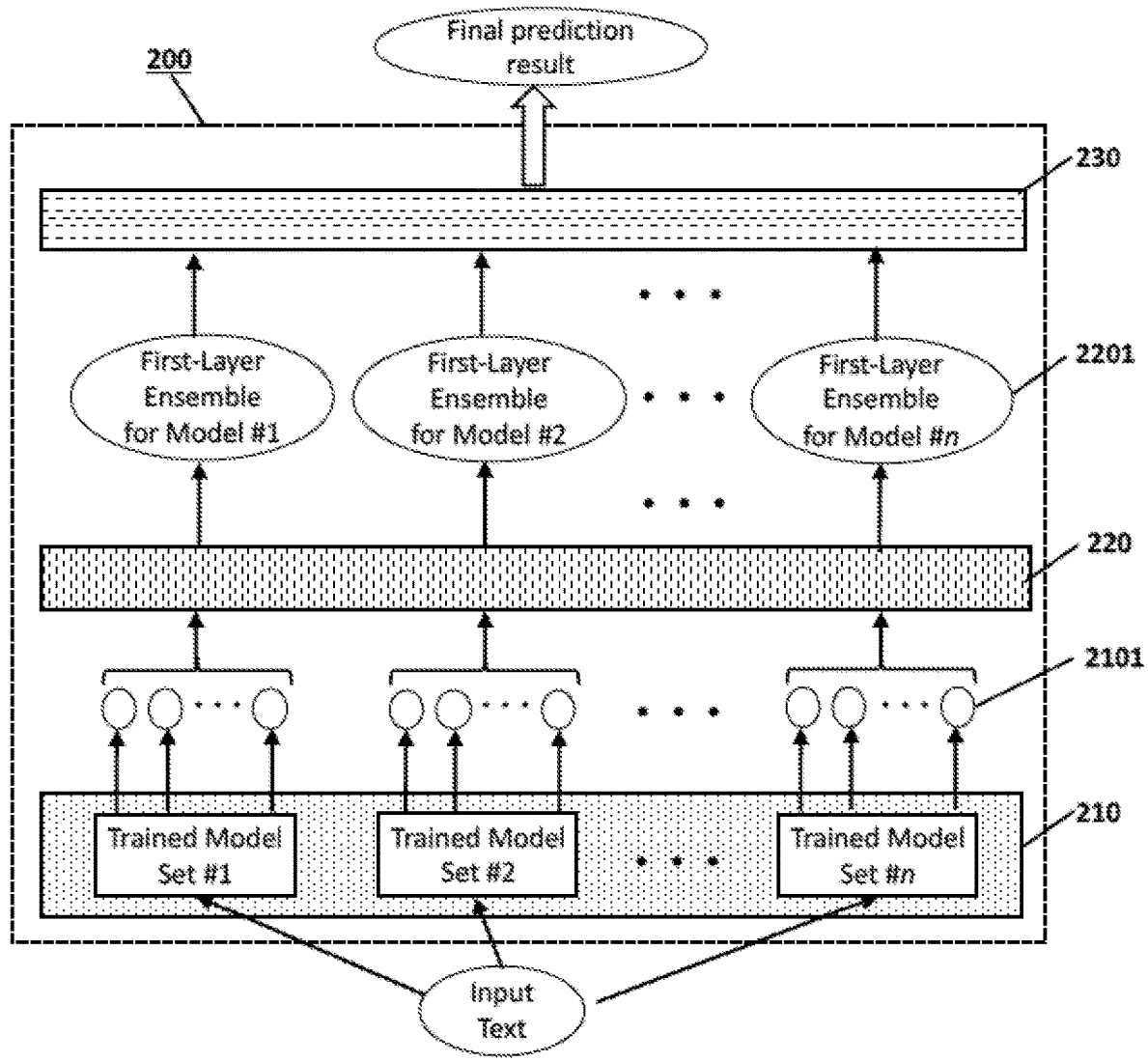
FIG. 3 illustrates a block diagram and a working process of the hierarchical prediction module of the intent classification system shown in FIG. 1A and FIG. 1B according to some embodiments of the disclosure.

FIG. 3 illustrates a block diagram and a working process of the hierarchical prediction module 200 of the intent classification system 001 according to some embodiments of the disclosure. As shown in the figure, the hierarchical prediction module 200 substantially comprises a calculation layer 210, a first ensemble layer 220, and a second ensemble layer 230.

The calculation layer 210 is configured to receive the input text, and then to calculate a prediction result 2101 (shown as a circle in the figure) based on each of the at least one trained model in each of the plurality of trained model sets that have been obtained from the training module 100. As such, after calculation by the calculation layer 210, a plurality of first-layer ensembled prediction results 2101 are thus obtained, each corresponding to one trained model in one particular trained model set.

Herein if the input data received by the intent classification system 001 is not in a form of text, the input data needs to be converted into an input text in order to be directly fed into the calculation layer 210 of the hierarchical prediction module 200.

The first ensemble layer 220 is further configured to receive the plurality of first-layer ensembled prediction results 2101 obtained from the calculation layer 210, and then to calculate a plurality of ensembled prediction results 2201 (short as a plurality of first-layer ensembles hereafter). Each of the plurality of first-layer ensembles is substantially obtained from those first-layer ensembled prediction results 2101 that correspond to a same trained model set, and thus also corresponds to a same model (i.e. Model # i in FIG. 2, where i is any integer between 1 and n). Therefore each of plurality of first-layer ensembles 2201 can be denoted as "First-Layer Ensemble for Model # i" illustrated in FIG. 3, where i is any integer between 1 and n.

Figure 4:
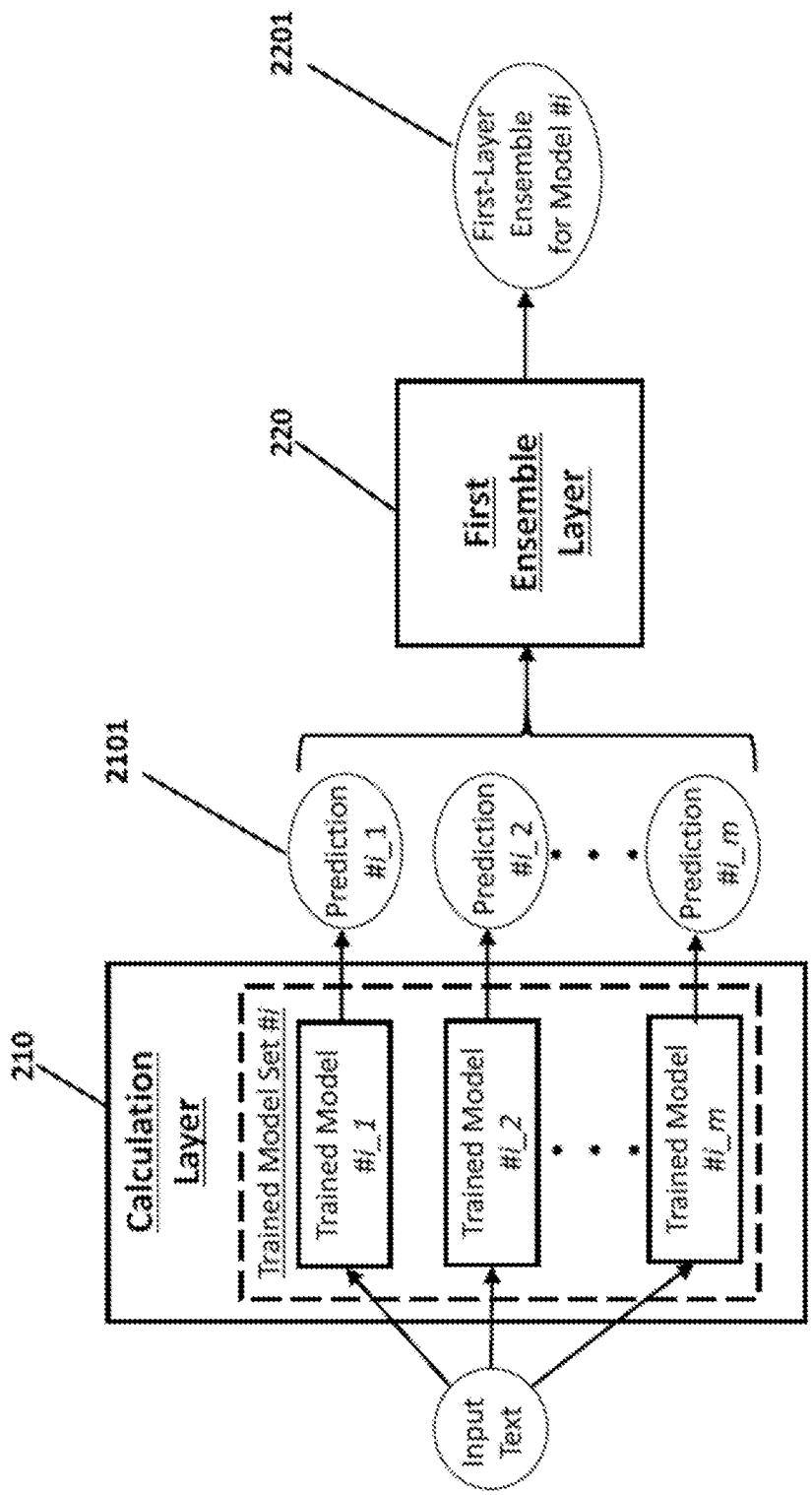
FIG. 4 illustrates a detailed working process for the calculation layer and the first ensemble layer in the hierarchical prediction module according to some embodiments of the disclosure.

FIG. 4 illustrates a more detailed working process for the calculation layer 210 and the first ensemble layer 220 in the hierarchical prediction module 200, where one first-layer ensemble is calculated from the input text based on a particular trained model set.

As shown in FIG. 4, for a given trained model set # i (encircled in a box with dotted lines in the figure, where i is any integer between 1 and n) that corresponds to model # i (i.e. Model # i), the trained model set # i includes a total of m trained models (illustrated as "Trained Model # i_1, Trained Model # i_2, . . . , Trained Model # i_m", where m is an integer ≥1), each based on a same model # i yet with a different initialization condition.

Based on the input text that has been received, the calculation layer 210 first performs calculation over each of the m trained models in the trained model set # i to correspondingly produce a total of m prediction results 2101 (illustrated as "Prediction # i_1, Prediction # i_2, . . . , Prediction # i_m" in the figure, where m is an integer ≥2), which all correspond to the Model # i. Then the first ensemble layer 220, upon receiving the m prediction results 2101 from the calculation layer 210, performs an ensembled calculation to thereby obtain an ensembled prediction result, which is substantially the first-layer ensemble 2201 corresponding to Model # i (shown as "First-Layer Ensemble for Model # i" in FIG. 4).

It is noted that for concision, only one trained model set # i is shown in FIG. 4. It is understandable that the calculation over each of the plurality of trained model sets which are respectively obtained from the training module 100 can be performed by the calculation layer 210 and the first ensemble layer 220 in a substantially same way.

It is further noted that the ensembled calculation performed by the first ensemble layer 220 can be based on a first pre-determined rule. According to some embodiments of the disclosure, the first pre-determined rule substantially comprises a majority vote with confidence approach. Specifically, for a given input text, if a majority of the more than one prediction result 2101 agree on one particular intent class, the first ensemble layer 220 chooses the one particular intent class as the ensembled prediction result corresponding to the trained model (i.e. the first-layer ensemble for the model); otherwise (if there is no majority of the more than one prediction result 2101 agreeing on any one intent class), the first ensemble layer 220 chooses one of the more than one prediction result having the highest confidence as the first-layer ensemble for the model.

Figure 5:
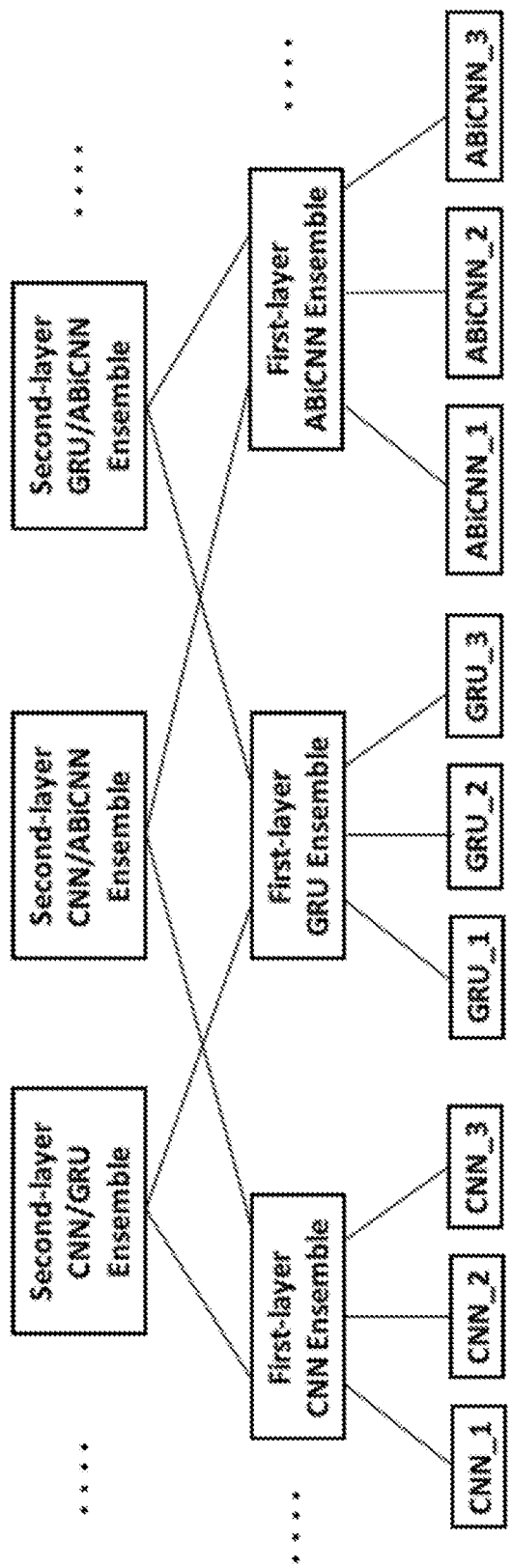
FIG. 5 illustrates the process for generating the first-layer ensembles and the second-layer ensembles according to one specific embodiment of the disclosure.

In the specific example illustrated in FIG. 5, for the three prediction results obtained respectively from the three trained models CNN_1, CNN_2, and CNN_3, the first ensemble layer 220 calculates the ensembled prediction result (denoted as "First-layer CNN Ensemble" in the figure) based on the first pre-determined rule of the majority vote with confidence. Similarly, for the three prediction results obtained respectively from the three trained models GRU_1, GRU_2, and GRU_3, the ensembled prediction result (denoted as "First-layer GRU Ensemble" in the figure) is calculated also based on the majority vote with confidence.

It is noted that the first pre-determined rule is not limited to the majority vote with confidence approach as mentioned above. Other rules/algorithms can also be applied by the first ensemble layer 220 as the first per-determined rule. Examples of these other rules/algorithms (i.e. rules/algorithms other than the majority vote with confidence described above) can also include deterministic algorithms such as majority vote with random tie-breaker or confidence-based pooling (i.e. choosing highest confidence regardless of agreement among models). In addition, a machine learning algorithm can also be trained to predict the best model predictions: e.g. logistic regression.

As such, the ensembled calculation performed by the first ensemble layer 220 substantially ensembles each individual trained model with different initialization conditions, which can exploit the benefits of different initialization conditions (e.g. different random initializations) to thereby mitigate the risk of converging to local optima in the ensembled prediction result compared with individual prediction result based on the same trained model with only one initialization condition for the weights.

With further reference to FIG. 3, after the plurality of first-layer ensembles 2201 for each of the plurality of models (i.e. the first-layer ensemble for model #1, the first-layer ensemble for model #2, . . . , and the first-layer ensemble for model # n) are obtained from the first ensemble layer 220, the plurality of first-layer ensembles 2201 are further fed into the second ensemble layer 230.

The second ensemble layer 230 then performs at least one ensembled calculation with the plurality of first-layer ensembles 2201 as inputs, to thereby obtain at least one second-layer ensembled prediction result (short as second-layer ensemble hereafter), each corresponding to one of the at least one ensembled calculation. The at least one second-layer ensemble can form a final prediction result that is ultimately outputted from the hierarchical prediction module 200 of the intent classification system 001.

Specifically, each of the at least one ensembled calculation performed by the second ensemble layer 230 substantially ensembles two or more of the plurality of first-layer ensembles 2201 obtained from the first ensemble layer 220 to thereby obtain a second-layer ensemble corresponding thereto.

Herein, each of the at least one ensembled calculation performed by the second ensemble layer 230 can be based on a second pre-determined rule. According to some embodiments of the disclosure, the second pre-determined rule substantially comprises a majority vote with confidence approach. Similar to the first pre-determined rule described above, other rules/algorithms can also be applied by the second ensemble layer 230 as the second per-determined rule. Examples of these other rules/algorithms (i.e. rules/algorithms other than the majority vote with confidence described above) can also include deterministic algorithms such as majority vote with random tie-breaker or confidence-based pooling (i.e. choosing highest confidence regardless of agreement among models). In addition, a machine learning algorithm can also be trained to predict the best model predictions: e.g. logistic regression.

In the specific example illustrated in FIG. 5, for the three first-layer ensembles obtained (i.e. the first-layer CNN ensemble, the first-layer GRU ensemble, the first-layer ABiCNN ensemble) that are illustratingly shown, three ensembled calculations are performed by the second ensemble layer 230, where any two of the above mentioned three first-layer ensembles are ensembled to thereby obtain the second-layer ensembles, including a second-layer CNN/GRU ensemble, a second-layer CNN/BiCNN ensemble, and a second-layer GRU/BiCNN ensemble. In each of the above three ensembled calculations are performed by the second ensemble layer 230, the majority vote with confidence approach is employed as the second pre-determined rule.

It is noted that the picking of the combination of two or more of the plurality of first-layer ensembles 2201 for each of the at least one ensembled calculation to be performed by the second ensemble layer 230 can vary depending on practical needs.

According to some embodiments where each of the plurality of models is pre-determined and is employed all for the second-layer ensembled calculations by the intent classification system 001 disclosed herein, the final prediction result can include only one second-layer ensemble which substantially ensembles each of the pre-determined models, or alternatively can include a plurality of second-layer ensembles, each substantially ensembling at least two, but no more than all, of the pre-determined models.

According to some other embodiments where the plurality of models comprise at least one model that is not pre-determined, an evaluation process needs to be performed to examine the effectiveness and accuracy of each first-layer ensemble, as well as each possible second-layer ensemble that substantially ensemble each of all possible combinations of the plurality of first-layer ensembles before picking the best scheme among all the first-layer ensembles and the second-layer ensembles for actual prediction using the models that are implicated in the best scheme. As such, in these embodiments, the second ensemble layer 230 substantially ensembles each and every of all possible combinations of the first-layer ensembles generated by the first ensemble layer 220 that are of size two or more.

Herein, and throughout the disclosure, each of the terms such as "module", "portion", "layer" can be regarded as a computer-implemented functional entity comprising at least one processor and a memory, wherein the memory stores a software program (i.e. computer codes or executable instructions), and the at least one processor performs a calculation based on the software program stored in the memory to thereby perform a task carrying out the prescribed functionality. In addition, each of the "portion", "layer", "module", and alike, may be a general computer having the software program, or can be a hardware computing device specifically designed for such a task. The computer and the hardware computing device can be locally arranged, or can be remotely arranged, such as on an intranet, an internet, or in a cloud.

As such, in contrast with the first ensemble layer 220 which substantially ensembles different initialization conditions of a single model, the second ensemble layer 230 substantially ensembles different models. Such an approach can, as illustrated in the specific example that follows, lead to an improved accuracy.

In a second aspect, the disclosure further provides a method for determining an intent class of an input text (short as an intent classification method hereafter).

Figure 6:
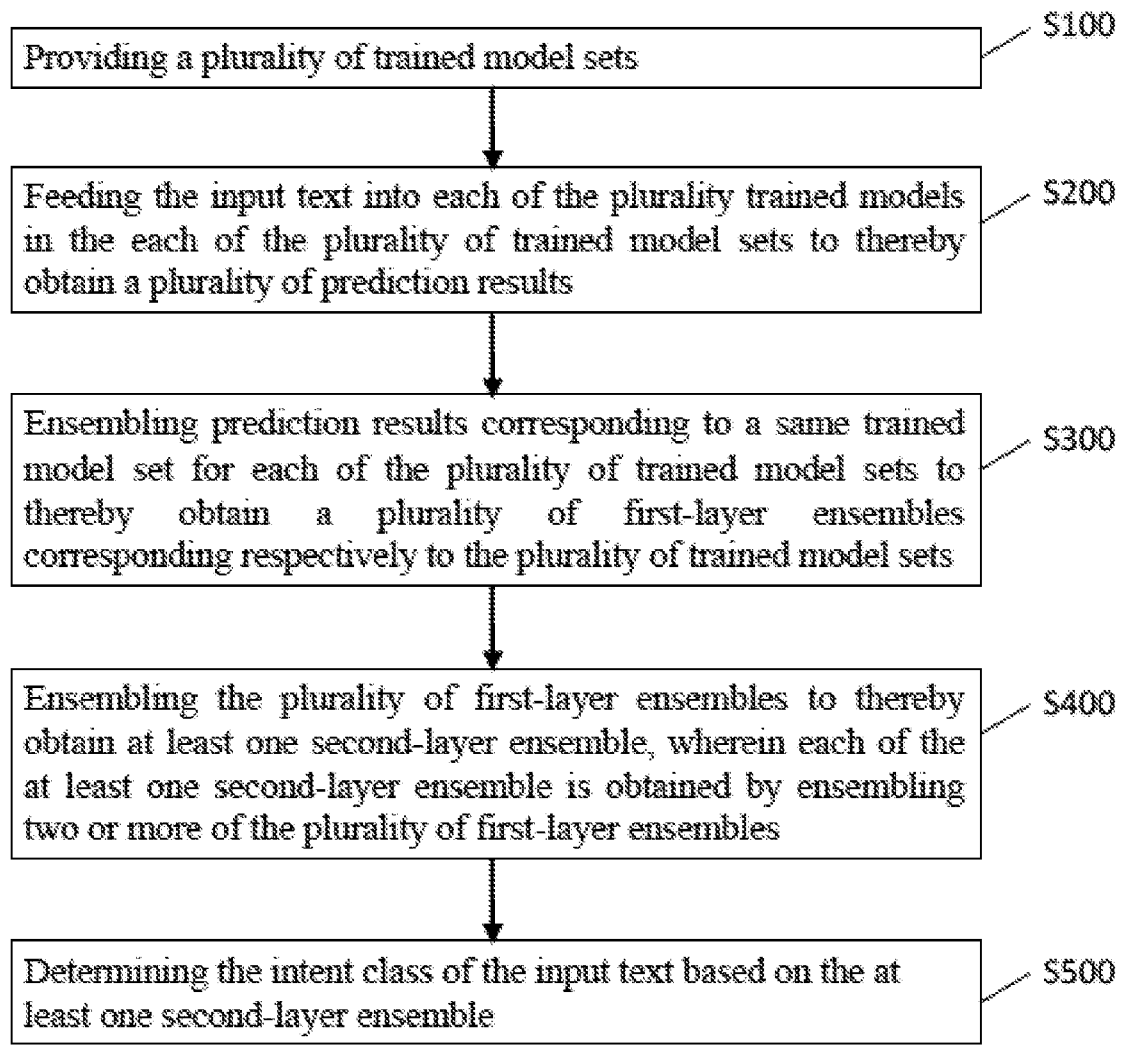
FIG. 6 is a flow chart of an intent classification method according to some embodiments of the disclosure.

FIG. 6 is a flow chart of an intent classification method according to some embodiments of the disclosure. As shown in FIG. 6, the intent classification method comprises the following steps:

S100: providing a plurality of trained model sets, wherein each of the plurality of trained model sets is based on a different model and comprises a plurality of trained models, wherein each of the plurality trained models in the each of the plurality of trained model sets is obtained by training a same model with a different initialization condition over a pre-determined dataset;

S200: feeding the input text into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

S300: ensembling prediction results corresponding to a same trained model set for each of the plurality of trained model sets to thereby obtain a plurality of first-layer ensembles corresponding respectively to the plurality of trained model sets;

S400: ensembling the plurality of first-layer ensembles to thereby obtain at least one second-layer ensemble, wherein each of the at least one second-layer ensemble is obtained by ensembling two or more of the plurality of first-layer ensembles;

S500: determining the intent class of the input text based on the at least one second-layer ensemble.

In the above intent classification method illustrated in FIG. 6, according to some embodiments of the disclosure, the step S100 (i.e. providing a plurality of trained model sets) can be carried out by means of the training module 100 as described above and illustrated in FIG. 1A, 1B, and FIG. 2, which substantially perform ab initio training over each of a plurality of models using data from the pre-determined dataset.

As such, the step S100 can substantially include the following sub-steps of:

S110: providing a plurality of models; and

S120: training each of the plurality of models using data from the pre-determined dataset to thereby obtain the plurality of trained model sets, wherein each of the plurality of trained model sets is based on a different model and comprises a plurality of trained models, wherein each of the plurality trained models in the each of the plurality of trained model sets is obtained by training a same model with a different initialization condition over a pre-determined dataset.

However, it is possible that one or more of the plurality of trained model sets are pre-determined or pre-exist according to some other embodiments, and as such, the one or more pre-determined trained model sets can be directly employed for the intent classification method. If all of the plurality of trained model sets are pre-determined, there is no need for ab initio training and the training module 100 is thus dispensable for the intent classification system 001 as described above.

Herein, each of the plurality models based on which the plurality of trained model sets are respectively built can be a machine learning algorithm (i.e. machine learning classifier), which can specifically be a deep learning classifier (e.g. CNNs, RNNs, multi-layer perceptron/deep neural networks, etc.) or a non-deep learning machine learning classifier (e.g. logistic regression, support vector machines (SVMs), and naive Bayes, etc.).

It is noted that in embodiments where a neural networks-based deep learning classifier is employed, the model is trained with same hyperparameters but with different random initializations for weights. In embodiments where a non-deep learning machine learning classifier is employed, it have slightly different parameters that would be randomly initializations during first-layer ensembling (deep learning models randomly initialize weights). For example, logistic regression and support vector machine could randomly initialize the C/lambda parameter, while the naive Bayes would randomly initialize the priors.

According to some embodiments of the disclosure, the plurality of models include at least one convolutional neural networks-based model, each optionally using a character-level embeddings, being attention-based, and/or using a bidirectional architecture. Specifically the plurality of models can include any one of, or any combination of, CNN, CharCNN, ABiCNN, and ACharBiCNN.

According to some embodiments of the disclosure, the plurality of models include at least one recurrent neural networks-based model, with either Long Short-Term Memory (LSTM) cell architecture and/or a Gated Recurrent Unit (GRU) cell architecture and optionally using character embeddings and/or a bidirectional architecture. Specifically the plurality of models can include any one of, or any combination of, GRU, CharGRU, BiGRU, and CharBiGRU, LSTM, CharLSTM, BiLSTM, and CharBiLSTM.

The pre-determined dataset can be a historical dataset containing pre-collected sentences with pre-labelled classifications/categories, and can be specific to any languages including English, Chinese, Spanish, etc. According to some embodiments of the method, the pre-determined dataset can include at least one of the ATIS dataset, the Banking dataset, the SMP dataset.

It is noted that in light of the specific example provided below, certain combinations of the models specific for certain pre-determined dataset can achieve better accuracy rate compared with other combinations and/or for other dataset.

As such, according to some embodiments where the plurality of models include at least one convolutional neural networks-based model, it preferably includes ABiCNN.

In embodiments where the pre-determined dataset is specific to a language whose characters contain rich semantic information, such as Chinese, the models preferably contain character-level embeddings According to some preferred embodiments of the intent classification method, the plurality of models include at least one convolutional neural networks-based model and at least one recurrent neural networks-based model, to take advantage of the diversity for the models.

In embodiments where the pre-determined dataset is ATIS, the plurality of models comprise GRU, BiGRU, BiLSTM, CNN, CharCNN, ABiCNN, and ACharBiCNN.

In embodiments where the pre-determined dataset is Banking, the plurality of models comprise CharGRU, CharLSTM, CharBiGRU, CharBiLSTM, CNN, CharCNN, ABiCNN, and ACharBiCNN.

In embodiments where the pre-determined dataset is SMP, the plurality of models comprise CharLSTM, CharBiGRU, CharBiLSTM, CharCNN, ABiCNN, and ACharBiCNN.

With further reference to FIG. 6, the above steps S200, S300, and S400 can be optionally carried out by the calculation layer 210, the first ensemble layer 220, and the second ensemble layer 230 in the hierarchical prediction module 200 of the intent classification system 001 as described above and illustrated in FIG. 3.

The step S300 substantially comprises a step of first-layer ensembling which basically ensembles different initialization conditions for each individual model, and the step S400 substantially comprises a step of second-layer ensembling which basically ensembles different models by ensembling the plurality of first-layer ensembles obtained in the step S300.

According to some embodiments of the method, either or both of a first pre-determined rule applied for the ensembling of the step S300 and a second pre-determined rule applied for the ensembling of the step S400 include a majority vote with confidence approach.

It is noted that rules/algorithms other than the majority vote with confidence approach can also be applied as any of the first per-determined rule or the second pre-determined rule. Examples can include deterministic algorithms such as majority vote with random tie-breaker or confidence-based pooling (i.e. choosing highest confidence regardless of agreement among models). In addition, a machine learning algorithm can also be trained to predict the best model predictions: e.g. logistic regression.

In a third aspect, the disclosure further provides a process for identifying one or a combination of models for an intent classification method with favorable accuracy based on a dataset (short as a model identification process hereafter).

Figure 7:
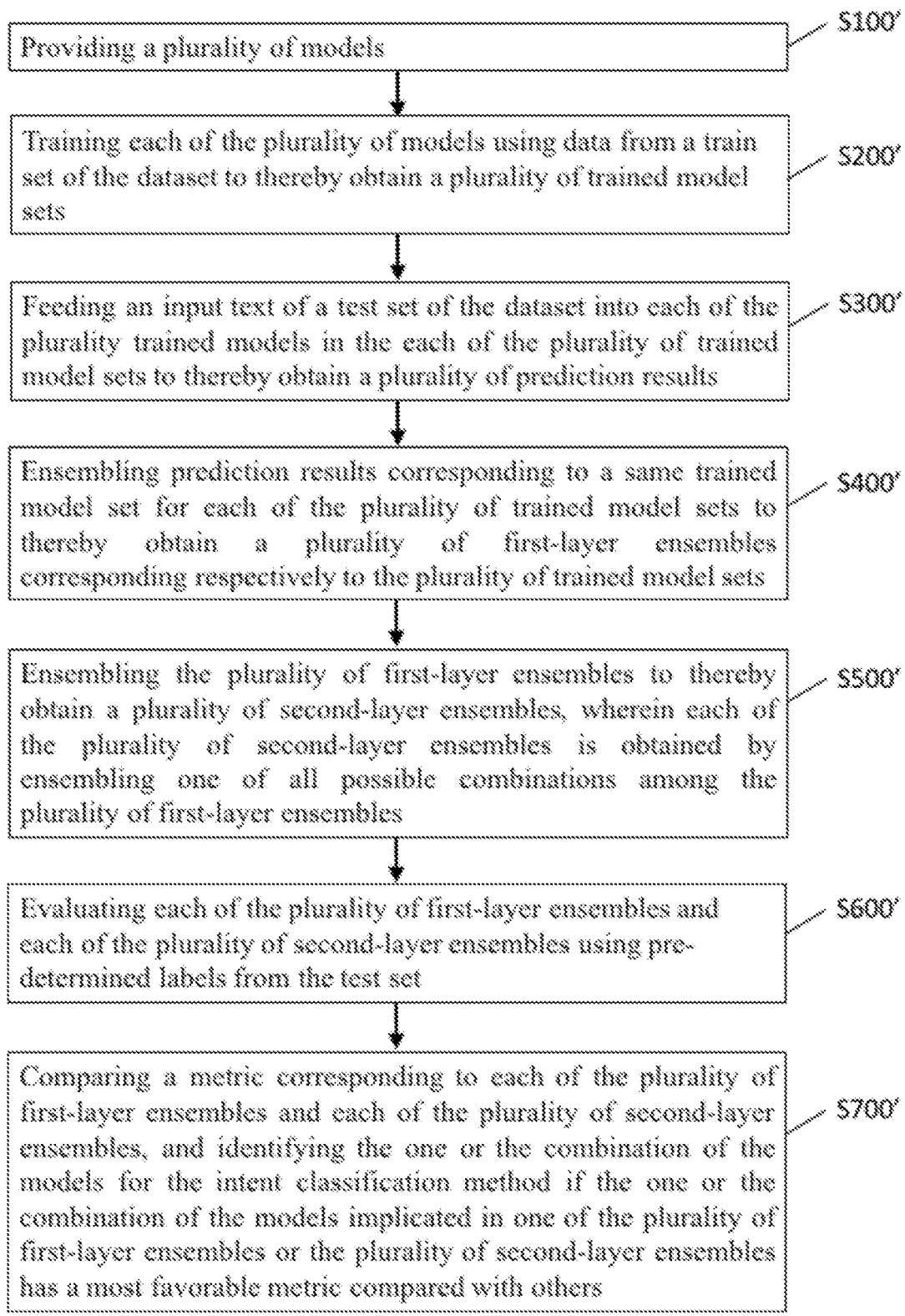
FIG. 7 is a flow chart of a model identification process according to some embodiments of the disclosure.

FIG. 7 is a flow chart of a model identification process according to some embodiments of the disclosure. As shown in FIG. 7, the model identification process comprises the following steps:

S100': providing a plurality of models;

S200': training each of the plurality of models using data from a train set of the dataset to thereby obtain a plurality of trained model sets, wherein each of the plurality of trained model sets is based on a different model and comprises a plurality of trained models, wherein each of the plurality trained models in the each of the plurality of trained model sets is obtained by training a same model with a different initialization condition over the dataset.

S300': feeding an input text in a test set of the dataset into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

S400': ensembling prediction results corresponding to a same trained model set for each of the plurality of trained model sets to thereby obtain a plurality of first-layer ensembles corresponding respectively to the plurality of trained model sets;

S500': ensembling the plurality of first-layer ensembles to thereby obtain a plurality of second-layer ensembles, wherein each of the plurality of second-layer ensembles is obtained by ensembling one of all possible combinations among the plurality of first-layer ensembles;

S600': evaluating each of the plurality of first-layer ensembles and each of the plurality of second-layer ensembles using pre-determined labels from the test set; and S700': comparing a metric corresponding to each of the plurality of first-layer ensembles and each of the plurality of second-layer ensembles, and identifying the one or the combination of the models for the intent classification method if the one or the combination of the models implicated in one of the plurality of first-layer ensembles or the plurality of second-layer ensembles has a most favorable metric compared with others.

Herein, the embodiments for the model identification process can reference to the various embodiments in the intent classification method described above.

In the above model identification process, data in the dataset can contain both a text (i.e. an input text) and a pre-determined label corresponding to the text (i.e. the intent class to which the input text belongs), and accordingly in the step S600', each of the predicted intent class based on the input text from the test set of the dataset (i.e. each of the plurality of first-layer ensembles and each of the plurality of second-layer ensembles) is evaluated by comparing with its corresponding pre-determined label (i.e. the intent class of a corresponding text that has been pre-determined).

Specifically for the model identification process described herein, the metric employed in the step S700' can be unweighted F1 score, but can also be another metric that can specifically compare the performance of different models, which can be weighted F1, precision, or recall. There are no limitations herein.

Figure 8:
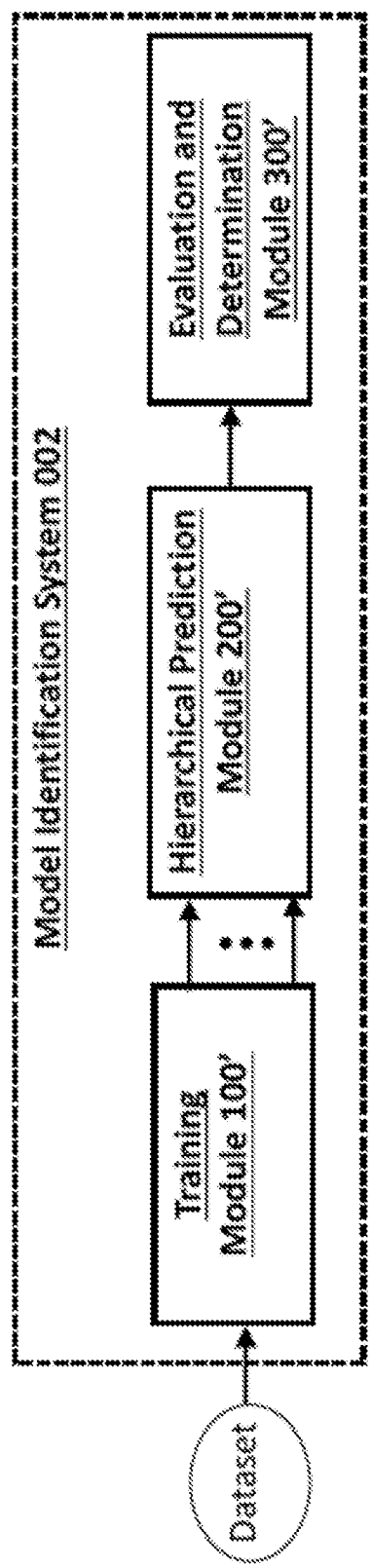
FIG. 8 illustrates a block diagram of a model identification system according to some embodiments of the disclosure.

Herein the model identification process can be implemented using a model identification system, whose block diagram is illustrated in FIG. 8. As shown, the model identification system 002 comprises a training module 100', a hierarchical prediction module 200', and an evaluation and determination module 300'.

The training module 100' and the hierarchical prediction module 200' are substantially same with the training module 100 and the hierarchical prediction module 200 in the intent classification system 001 as described above and illustrated in FIGS. 1A and 1B. Substantially same with the intent classification system 001, the hierarchical prediction module 200' in the model identification system 002 also comprises a calculation layer, a first ensemble layer, and a second ensemble layer (not shown in the drawings), which substantially work in a same way as the counterparts in the hierarchical prediction module 200 in the intent classification system 001.

Specifically, the step 200' of model training can be performed by means of the training module 100' in the model identification system 002. The steps 300', 400', and 500' can be carried out respectively by the calculation layer, the first ensemble layer, and the second ensemble layer in the hierarchical prediction module 200'. The steps S600' and S700' can be performed by the evaluation and determination module 300'.

It is noted that the intent classification system 001 and the model identification system 002 can be integrated as one single system according to some embodiments of the disclosure.

In the intent classification system 001 and/or the model identification system 002 disclosed herein, the training module 100 can be arranged to work in an offline stage. In other words, the training for each of the plurality of models by the training module 100 can be performed in an offline mode.

The hierarchical prediction module 200 can be arranged to work in an offline or online stage, when the input data can be fed into the module for determining the intent class thereof in a real-time or an online mode, or alternatively in an offline mode.

One example includes: a user utterance can be recognized as, and converted into, an input text by a speech recognizer, which is configured as part of a cellular phone or a chatbot. The input text can then be uploaded into a cloud server having the hierarchical prediction module 200 in the intent classification system 001, where the intent class for the user utterance can be determined in an online and real-time mode. The intent class can then be transmitted back to the user or can be utilized for further analysis for, or for further interaction with, the user.

It is noted that in the above three aspects of the disclosure (i.e. the intent classification system, the intent classification method, and the model identification process), some machine learning classifiers (i.e. machine learning models) may not give a score that can be easily interpreted as a probability (e.g. decision trees), but those classifiers could still work with machine learning ensembling algorithms or majority vote with random tie-breaker.

In the following, with reference to FIG. 5, one specific embodiment of an intent classification system and a method for intent classification utilizing the intent classification system will be described in detail. Specifically, the following provides the experimental setup for the illustrating example.

1.0 DATA

1.1 ATIS

The ATIS (Airline Travel Information System) dataset was collected by DARPA in the early 90's (Price, 1990; Tur et al., 2010). It is one of the most frequently used dataset for SLU (spoken language understanding) research. It was based on spoken queries regarding flight related information. An example utterance is: "I'd like to fly from Boston to San Francisco." The dataset exists in both spoken and text form; and the text form is used here.

The utterances are represented by semantic frames, where each sentence has a single or multiple intents and slots filled with phrases. Labels are encoded with IOB (Inside Outside Beginning) representation (Sang et al., 1999). There are 17 single intents and 8 multiple intent combinations. The distribution is biased as the most frequent intent, Flight, represents about 70% of the traffic. The ATIS train set contains 4,978 sentences. The test set contains 893 sentences.

1.2 Banking

For a particular banking-related application, the domain specific data is used. The proprietary banking dataset was collected as an initial in-house pilot study of 360 usable written utterances and increased to a total of 5,358 usable (clean) utterances by utilizing Mechanical Turk. An example utterance is: "I would like to open a checking account." Data collection was based on 12 prompts representing different slot/intent combinations.

The utterances were tokenized and annotated following the IOB representation used in the ATIS dataset, with single or multiple intents. There are 9 single intents, including the Null Intent, and 10 dual intent combinations. The distribution is somewhat skewed towards the Find Out intent, but is much more evenly distributed than ATIS. The banking train set contains 4,286 sentences. The test set contains 1,072 sentences.

1.3 SMP

The SMP2017ECDT (SMP) dataset is a Chinese domain classification dataset consisting of textual queries recorded from human-computer dialogues (Zhang et al., 2017). The datasets was divided into a train and a test set of 3,069 and 667 samples respectively. The first step for many QA systems is to categorize a user intent into a specific domain, and these domains are considered as the first level user intents, for instance, "结婚了吗" (Are you married) is labeled as Chit-chat, which implies that the user intent is related to chit-chatting.

The domains cover 31 categories, including Chit-chat and 30 task-oriented categories. The SMP dataset is skewed towards Chit-chat with around 20% of data in it, and the rest of the 30 categories are more evenly distributed. Since the Chinese data given is not tokenized, the Jieba tokenizer (github.com/fxsjy/jieba) was used to tokenize the sentences.

2.0 TECHNICAL BACKGROUND

2.1 Task

Intent classification is the task of correctly labeling a natural language utterance from a predetermined set of intents. It is treated as a multiclass classification task, and a discriminative machine learning model is trained to output a predicted classification for a given utterance. In cases where an utterance has multiple intents, the intents are concatenate and the result is treated as a single, distinct intent. This allows the task to be treated as single-label, even when multiple intents are used.

CNN and RNN models were used to perform this statistical inference. These models are trained on labeled utterances using backpropagation and gradient descent. At inference time, the models compute the probability distribution over all intent classes for a given utterance conditioned on the trained weights. This probability for each intent label is calculated by taking the softmax of the model outputs, and the predicted class is then simply chosen by taking the argmax of the distribution.

2.2 CNNs:

Convolutional Neural Networks (CNNs) are widely used for sentence classification tasks (LeCun and Bengio, 1995). CNNs have proven to be effective for NLP tasks like sentence classification (Kim, 2014). Besides a baseline of a simple CNN with four interleaved layers of convolution and pooling, three CNN variants were developed, including a character-level model (dos Santos and Zodrozny, 2014), CharCNN, an attention based (Neumann and Vu, 2017) bidirectional model (Vu, 2016), ABiCNN, and a combination of both variants which is a character-level attentive bidirectional model, ACharBiCNN. Samples of variable lengths were padded to the maximal sample length of all samples in a dataset in order to do mini-batch training. There are 50 and 100 convolution filters for the first and second convolution respectively.

The character approach (dos Santos and Zodrozny, 2014) (i.e. CharCNN) learns a word representation from the characters that make up a word in a character embedding layer. The output of the character embedding layer will be a mini batch of sentences embedded with the combined vector, which is followed by the normal CNN convolution and pooling layers.

A bidirectional CNN structure (Vu, 2016) and an attention mechanism (Neumann and Vu, 2017) were also applied. Bidirectional NNs have shown better performances than unidirectional NNs in language modeling and machine translation (Vu, 2016; Bandanau et al., 2015). Attention based neural models have been seen successfully used in pattern recognition (Olshausen et al., 1993), NLP (Yin et al., 2016), and computer vision tasks (Sun and Fisher, 2003).

The attentive bidirectional CNN model (i.e. ABiCNN) is built as follows. A bidirectional CNN takes inputs from a positive and a negative time direction, so that the output gets information from both past and future states. A combined hidden layer output can thus be obtained by a weighted sum of the individual hidden layer outputs, activated by a non-linear activation function. Then attention mechanism is applied, which helps attend to important parts of a feature map by learning weights of each part. The attention based bidirectional hidden layer output is then input to a fully-connected layer, followed by a softmax layer.

By combining the character embedding approach and the attention mechanism, the character-level attentive bidirectional CNN model (i.e. ACharBiCNN) were obtained.

2.3 RNNs

RNNs are deep neural networks designed to process sequential data. They have proven to be very effective for many natural language processing tasks, including language modeling and text generation. RNNs are distinguished from traditional deep neural networks by the use of a cell architecture that is sequentially unrolled for a specified number of timesteps. This allows the network to communicate through multiple timesteps, effectively remembering past information.

However, it was noted that RNNs suffer from the vanishing gradient problem when the number of timesteps exceed a small number, prohibiting the network from remembering long-term information. To correct this problem, many RNN architectures were suggested that would allow for longer-term memory. Two of the most popular, which were used in this work, are the Long Short-Term Memory (LSTM) cell (Hochreiter and Schmidhuber, 1997), and the Gated Recurrent Unit (GRU) cell (Cho et al., 2014).

When developing RNN models for intent classification, many architectural considerations were looked at, including using a LSTM or GRU cell architecture, using character embeddings as described in Section 3.2 (dos Santos and Zodrozny, 2014), and using a bidirectional architecture (Schuster et al., 1997).

A model for each combination were then created, resulting in 8 total models. Each model has 512 hidden units and a word embeddings size of 300. Models with character embeddings have a character embedding size of 300. Word and character embeddings were randomly initialized and trained along with the model's other weights, without the use of any pretrained vectors. 100 epochs were trained for with a batch size of 32 and a dropout rate of 0.5.

2.4 Multi-Layer Ensembling

Experiments were run on numerous multi-layer ensembles of the CNN and RNN models, as well as the individual models themselves, on all three datasets. The ensembles and individual models on each test set were evaluated, and the unweighted F1 score were used as metric. When ensembling models, a majority vote with confidence approach was used. For each utterance, it was tested if a majority of the models agree upon the prediction. If so, that prediction was chosen. If not, the confidence of each model's prediction as measured by the softmax score was compared, and the highest score was taken.

The multi-layer ensemble approach is comprised of distinct first-layer and second-layer ensembles (FIG. 5). To obtain first-layer ensembles, each model was first trained three times with the same hyperparameters but different random initializations for the weights. Then a majority vote with confidence was utilized to find the ensemble predictions, and finally the F1 score was calculated. In Tables 1, 2, 3, and 6, 7, 8, the three individual model F1 scores (columns "1", "2", "3"), as well as their ensemble F1 (column "En"), are shown.

To obtain the second-layer ensembles, all possible combinations of the first-layer ensembles that are of size two or more were generated. As there are 12 first-layer ensembles, this gives second-layer ensembles with {2, 3 ... 12} number of first-layer ensembles. This yields $2^{12}-12-1=4083$ distinct second-layer ensembles. Again majority vote with confidence was used to evaluate the second-layer ensembles. Tables 4, 5, 9, and 10 compare F1 scores of different second-layer ensembles.

3.0 EXPERIMENTS AND RESULTS 3.1 CNN Ensembles

The results of experiments on ensembling single CNN models are listed for ATIS (Table 1), banking (Table 2), SMP (Table 3).

TABLE 1

| CNN ATIS First-layer Ensemble $F_1$ | | | | |
|---|---|---|---|---|
| Model | 1 (%) | 2 (%) | 3 (%) | En (%) |
| CNN | 95.41 | 95.52 | 95.63 | 95.97 |
| CharCNN | 91.94 | 92.50 | 93.39 | 94.40 |

TABLE 1-continued

| CNN ATIS First-layer Ensemble $F_1$ | | | | |
|---|---|---|---|---|
| Model | 1 (%) | 2 (%) | 3 (%) | En (%) |
| ABiCNN | 96.64 | 96.75 | 97.09 | 97.20 |
| ACharBiCNN | 93.73 | 93.84 | 94.29 | 95.07 |

TABLE 2

| CNN Banking First-layer Ensemble $F_1$ | | | | |
|---|---|---|---|---|
| Model | 1 (%) | 2 (%) | 3 (%) | En (%) |
| CNN | 87.22 | 87.59 | 88.90 | 89.27 |
| CharCNN | 87.59 | 87.69 | 88.53 | 89.18 |
| ABiCNN | 88.99 | 89.37 | 89.83 | 90.11 |
| ACharBiCNN | 88.25 | 88.71 | 89.09 | 90.11 |

TABLE 3

| CNN SMP First-layer Ensemble $F_1$ | | | | |
|---|---|---|---|---|
| Model | 1 (%) | 2 (%) | 3 (%) | En (%) |
| CNN | 85.46 | 85.61 | 86.06 | 87.26 |
| CharCNN | 83.36 | 83.81 | 84.11 | 86.51 |
| ABiCNN | 86.36 | 86.51 | 86.96 | 88.16 |
| ACharBiCNN | 84.41 | 85.01 | 85.61 | 89.06 |

3.1.1 First-Layer Ensembles

The first thing that draws an attention is that first-layer ensembling improves the performances on all individual models across all three datasets. Despite slight performance differences at each of the three times of training, the F1 scores of ensembles are higher than all of individual models.

Comparing the ensemble F1 with the average F1 of all three individual models, there is a lowest 0.37% improvement (ABiCNN on ATIS with individual scores: 96.64%, 96.75%, 97.09%, ensemble score: 97.20%) and a highest 4.05% improvement (ACharBiCNN on SMP with individual scores: 84.41%, 85.01%, 85.61%, ensemble score: 89.06%). This shows that first-layer ensembles help to exploit the benefits of different random initializations, mitigating the risk of converging to local optima.

3.1.2 Second-Layer Ensembles

In addition, with the first-layer ensemble results as input, the second-layer ensemble shows some interesting results when it comes to combining models of different structures. Out of the 11 second-layer ensembles of different combinations of the CNN models, the focuses are on comparing the ensemble of character embedding based single-model ensembles with the ensemble of simple CNNs, the ensemble of attention and bidirectional based single-model ensembles with the ensemble of simple CNNs, and the ensemble of character embedding based single-model ensembles with the ensemble of attention and bidirectional based ones.

An exhaustive comparison across all 2-ensembles, 3-ensembles, and the all-ensemble was performed, and it was found that the second-layer ensembles outperformed their component first-layer ensembles. The most interesting 2-ensemble results was shown in Table 4. The average increase is calculated by averaging the increase for all three datasets, where the increase for each dataset is again given by the average of percentage increase of the ensemble (e.g. CNN/CharCNN) compared to its component single-model ensembles (e.g. CNN and Char-CNN).

TABLE 4

F₁ Scores of the Most Interesting CNN Second-layer 2-Ensemble

| Model | ATIS (%) | Banking (%) | SMP (%) | Average increase (%) |
|---|---|---|---|---|
| CNN/CharCNN | 95.97 | 89.46 | 87.71 | 1.14 |
| CNN/ABiCNN | 96.70 | 90.49 | 89.81 | 2.10 |
| CNN/ACharBiCNN | 95.97 | 90.11 | 89.51 | 1.48 |
| CharCNN/ABiCNN | 96.19 | 90.58 | 88.76 | 1.70 |

The idiosyncrasies of the best models across datasets were analyzed. The best F1 on ATIS, Banking, and SMP (Table 5) are 97.20% with a minimal first-layer ABiCNN ensemble, 90.86% with a minimal second-layer CNN/ABiCNN/ACharBiCNN ensemble, and 89.96% with a minimal second-layer CNN/CharCNN/ABiCNN ensemble. It seems that the specific ensemble constituents differ from dataset to dataset, but there is a dominant first-layer ensemble component ABiCNN appearing in all best ensembles across all three datasets, and it results from the fact that the attention structure and bidirectionality generally contribute additional contextual information to learning, regardless of the language the data is in.

From another aspect, despite of idiosyncratic components in the best models, a combination of different model structures, like combining simple structures with character embeddings, attention, and bidirectionality, will further help reduce False Positive rates as they compensate for one another on a probabilistic basis.

TABLE 5

CNN Best Ensembles

| Dataset | F₁ (%) | Ensemble |
|---|---|---|
| ATIS | 97.20 | ABiCNN |
| Banking | 90.86 | CNN, ABiCNN ACharBiCNN |
| SMP | 89.96 | CNN, CharCNN, ABiCNN |

3.2 RNN Ensembles

A series of experiments on RNN first-layer and second-layer ensembles on all three datasets were performed. First-layer ensembles were obtained by collecting F1 scores of each RNN model's three trained versions and their ensemble for ATIS (Table 6), Banking (Table 7), and SMP (Table 8). Second-layer ensemble experiments on all of the RNN models were then performed, and the best ensemble for each dataset was recorded in Table 9.

TABLE 6

RNN ATIS First-layer Ensemble F₁

| Model | 1 (%) | 2 (%) | 3 (%) | En (%) |
|---|---|---|---|---|
| GRU | 96.98 | 97.20 | 97.31 | 97.31 |
| CharGRU | 95.07 | 95.30 | 95.41 | 95.63 |
| BiGRU | 96.30 | 96.53 | 97.20 | 96.86 |
| CharBiGRU | 94.18 | 94.29 | 94.40 | 94.62 |
| LSTM | 96.19 | 96.53 | 96.86 | 96.98 |
| CharLSTM | 95.07 | 95.97 | 96.86 | 96.53 |
| BiLSTM | 96.75 | 96.75 | 96.86 | 97.09 |
| CharBiLSTM | 93.95 | 94.51 | 94.74 | 94.74 |

TABLE 7

RNN Banking First-layer Ensemble F₁

| Model | 1 (%) | 2 (%) | 3 (%) | En (%) |
|---|---|---|---|---|
| GRU | 87.69 | 87.78 | 88.53 | 88.15 |
| CharGRU | 88.15 | 88.62 | 89.55 | 90.02 |
| BiGRU | 86.94 | 87.69 | 88.15 | 88.15 |
| CharBiGRU | 86.66 | 87.41 | 89.18 | 88.99 |
| LSTM | 87.97 | 88.06 | 88.43 | 88.99 |
| CharLSTM | 88.90 | 89.18 | 89.74 | 90.67 |
| BiLSTM | 87.69 | 88.99 | 89.18 | 89.65 |
| CharBiLSTM | 88.53 | 88.90 | 89.09 | 89.93 |

TABLE 8

RNN SMP First-layer Ensemble F₁

| Model | 1 (%) | 2 (%) | 3 (%) | En (%) |
|---|---|---|---|---|
| GRU | 83.06 | 83.96 | 85.61 | 84.71 |
| CharGRU | 86.81 | 88.31 | 89.36 | 89.96 |
| BiGRU | 84.11 | 85.31 | 86.21 | 86.66 |
| CharBiGRU | 85.16 | 87.11 | 87.41 | 88.46 |
| LSTM | 84.41 | 85.76 | 85.91 | 87.26 |
| CharLSTM | 88.01 | 88.31 | 89.51 | 91.30 |
| BiLSTM | 83.81 | 84.86 | 86.06 | 86.36 |
| CharBiLSTM | 87.56 | 88.16 | 88.76 | 89.51 |

3.2.1 First-Layer Ensembles:

Many interesting points can be derived from these results. Firstly, each model benefits greatly from ensembling. More specifically, every first-layer ensemble performs better than at least two of its individual versions, and the vast majority outperform all three. The average F1 gain for first-layer RNN ensembles is 0.66% (ATIS), 1.50% (Banking), and 2.66% (SMP).

It can also been seen how model complexity affects performance across different datasets. For example on ATIS, the simple GRU model is the highest scoring first-layer ensemble with 97.31%. Adding complexity, either through bidirectionality or character embedding generally lowers performance, with CharBiGRU and CharBiLSTM getting the lowest scores of 94.62% and 94.74% respectively.

This is in contrast to Banking, where character embedding always helps performance (e.g. 88.15% (GRU) to 90.02% (CharGRU)), and bidirectionality giving mixed results. SMP performance also contrasts with ATIS, as GRU performs worst, and character embedding helps greatly (e.g. 87.26% (LSTM) to 91.30% (CharLSTM)).

It is particularly interesting that Banking and SMP follow similar performance trends, despite the stark lexical and syntactic differences between English and Chinese, as well as ATIS and Banking having such different performance characteristics despite being the same language and similar size. This points to dataset/model coherence being based on subtle data characteristics. It is not obvious by inspecting ATIS and Banking data why character embedding is beneficial for Banking but detrimental for ATIS, though Banking's greater semantic diversity may be a contributing factor.

A related consideration is the relationship between bidirectionality and character embedding. In all three datasets, CharBiGRU and CharBiLSTM show significantly lower performance than their corresponding unidirectional versions, Char-GRU and CharLSTM. This indicates that character embeddings and bidirectionality are somehow incompatible in an RNN architecture. This may suggest that the temporal information that is gained by reading input in both directions is lost or confused by embedding input as both words and characters.

Another interesting result is how performance ranges between single model ensembles vary between different datasets. While Banking and ATIS only have a 2.52% range (88.15% GRU and Bi-GRU to 90.67% CharLSTM) and 3.12% range (94.62% CharBiGRU to 97.74% GRU) respectively, SMP has a 6.59% range (84.71% GRU to 91.30% CharLSTM), more than twice either of the others.

However, that range mostly captures the difference between character embedded models and non-character embedded models. Consequently, while character embedding may help for English datasets like Banking, it is critical for Chinese datasets, where characters contain rich semantic information.

3.2.2 Second-Layer Ensembles

Finally, some results can be drawn from the RNN second-layer ensemble experiments (Table 9). It is observed that each best second-layer ensemble outperforms all of its single model ensembles, showing that second-layer ensembles further increase the performance of first-layer ensembles. Each best second-layer ensemble also contains at least one GRU and at least one LSTM, again pointing to the importance of diversity in ensembling.

TABLE 9

RNN Best Second-layer Ensembles

| Dataset | $F_1$ (%) | Ensemble |
|---|---|---|
| ATIS | 97.42 | GRU, LSTM, BiGRU, BiLSTM, CharGRU, CharBiLSTM |
| Banking | 91.32 | CharGRU, CharLSTM |
| SMP | 91.60 | BiGRU, CharGRU, CharLSTM, CharBiGRU |

3.3 CNN and RNN Ensembles 3.3.1 Second-Layer Ensembles:

Table 10 shows the best second-layer ensembles resulting from experiments with all 12 first-layer ensembles. On ATIS, multiple second-layer ensembles obtain the highest F1 of 97.54%. One of these is shown in table 10, though other ensembles also obtain the same performance, including {GRU, BiLSTM, ABiCNN}.

The first thing to note here is that these ensembles generally contain six or more first-layer ensembles, indicating that there is some critical mass of models needed to achieve maximum performance. Also, these ensembles have an even or very close to even split between RNN and CNN models, as well as at least one character embedded and one bidirectional model. This extends the theme discussed earlier, that greater performance is achieved through a diverse ensemble.

Especially strong proof of this in SMP's best second-layer ensemble performance of 93.55% can be observed. This is a nearly two percent increase from the best RNN second-layer ensemble of 91.60%, and a more than three percent increase from the best CNN second-layer ensemble of 89.96%. This large performance increase over two robust second-layer ensembles clearly shows that diversity of model architecture is critical for ensemble success.

TABLE 10

Best Second-layer Ensembles

| Dataset | $F_1$ (%) | Ensemble |
|---|---|---|
| ATIS | 97.54 | GRU, BiGRU, BiLSTM, CNN |
| Banking | 91.79 | CharCNN, ABiCNN, ACharBiCNN, CharGRU, CharLSTM, CharBiGRU, CharBiLSTM |
| SMP | 93.55 | CNN, CharCNN, ABiCNN, ACharBiCNN, CharLSTM, CharBiGRU, CharBiLSTM, CharCNN, ABiCNN, ACharBiCNN |

Table 11 shows the performance difference between the best second-layer ensembles without and with character embedding. Again as can be seen, character embedding is critical for the Chinese dataset, and much less so for the English datasets. Additionally, on ATIS, second-layer ensembles both with and without character embedding attain the best performance.

This points to second-layer ensembling being effectively only beneficial; diverse second-layer ensembles can raise performance without any real risk of degrading performance by adding specific models, even if those models do poorly by themselves.

TABLE 11

Best Multi-layer Ensemble $F_1$ without and with character embedding

| Dataset | No Char (%) | Char (%) | Gain (%) |
|---|---|---|---|
| ATIS | 97.54 | 97.54 | 0.00 |
| Banking | 91.04 | 91.79 | 0.75 |
| SMP | 91.45 | 93.55 | 2.10 |

The performance between datasets were also compared. ATIS performs 5.75% better than Banking, and 3.99% better than SMP, while SMP performs 1.76% better than Banking. Indeed, throughout both first-layer and second-layer ensembles, the same models and ensembles generally perform better on ATIS than Banking and SMP. This indicates that some datasets are generally easier for models to learn than others.

The difficulty of SMP can at least in part be explained by having a much more diverse set of intents than either Banking or ATIS. Also, both Banking and SMP have a greater lexical and stylistic range than ATIS, certainly making training more difficult.

Finally, Table 12 shows the average first-layer and average second-layer performance increases, as well as the total F1 range for each dataset. The average ensemble performance increases were calculated by averaging each ensemble's average difference between its performance and the performance of each of its constituent models, and the total range was calculated as the difference between the best individual model and the best second-layer ensemble.

As can be seen here, ensembling is much more important for some models and datasets than others, though clearly both first-layer and second-layer ensembling is more important for SMP than Banking or ATIS. The ranges represent the potential total performance increase that someone may gain through utilizing multi-layer ensembling. As can be seen, ensembling helps less for the easier ATIS dataset, but that total increases of around 2% and 4% on Banking and SMP are significant. Furthermore, these ranges start from the best possible individual models; ranges from other individual models can be significantly greater. Together, these results show that ensembling can be a powerful technique for creating better intent classification systems.

TABLE 12

Average First-layer and Second-layer Ensemble $F_1$ increases, and Total $F_1$ Range

| Model | ATIS (%) | Banking (%) | SMP (%) |
|---|---|---|---|
| First | 0.54 | 1.03 | 1.91 |
| Second | 0.94 | 1.24 | 2.91 |
| Range | 0.23 | 1.96 | 4.04 |

3.4 Comparison to Previous Approaches

Tables 13 and 14 show how the best ensembles in the study perform compared to other approaches. It can be seen that the best ensembles in this study perform quite well compared to other approaches on both ATIS and SMP. Many of these models are considerably more sophisticated than the models and the approach disclosed herein. For example, Liu and Lane (2016) use an encoder-decoder architecture, which combines two separate neural networks, and Tang et al. (2017) use a separate databased keyword extraction algorithm along with a deep learning model.

The models disclosed herein, on the other hand, are all standard models that can be developed quickly without needing to fine-tune the architecture. The result that the ensembles of simpler models can perform in the same range as these more sophisticated models shows that ensembling is a viable strategy for achieving very high performance on a dataset without intensive model engineering. This simplicity is also advantageous from an industry viewpoint. Since the models disclosed herein don't involve time-consuming development, they can more easily be deployed to a production environment.

TABLE 13

Comparison to previous intent-only approaches on ATIS

| Model | $F_1$ (%) | Development Time |
|---|---|---|
| Recursive NN (Guo et al., 2014) | 95.40 | High |
| Bidirectional GRU with Context Window (Zhang and Wang, 2016) | 97.53 | High |
| Attention Encoder-Decoder NN (Liu and Lane, 2016) | 97.98 | High |
| Our Best Ensemble | 97.54 | Low |

TABLE 14

Comparison to top SMP2017 submissions

| Model | $F_1$ (%) | Development Time |
|---|---|---|
| Self-Inhibiting Residual CNN (Lu, 2017) | 92.88 | High |
| LSTM with database keyword extraction (Tang et al., 2017) | 93.91 | High |
| Our Best Ensemble | 93.55 | Low |

4.0 CONCLUSION

Running intent classification experiments on many variants of CNN and RNN models, as well as numerous first-layer and second-layer ensembles of those models, presented two main conclusions.

First, both first-layer and second-layer ensembling can boost performance greatly, and greater diversity ensembles almost always leads to better results. Indeed, a large, diverse ensemble of straightforward models can be competitive with much more sophisticated state-of-the-art models. Consequently, researchers and engineers hoping to improve performance on intent classification should not hesitate to use multi-layer ensembling in their work.

The second main conclusion concerns the idiosyncratic nature of datasets. Different models and ensembles perform quite differently on even fairly similar datasets. Although some architectures do show general performance trends across tasks and datasets, such as RNNs generally outperforming CNNs on natural language processing tasks, different datasets are idiosyncratic enough that it is extremely difficult to know a priori which specific model will work best for a given dataset. Network architecture, cell type, character embedding, bidirectionality, and attention can all affect datasets very differently. This idiosyncrasy strengthens the case for using ensemble methods, as they can help to distribute the insights of specific models across different datasets.

In this work, an extensive set of multilayer ensemble experiments were run on three different datasets for the intent classification task. It is thus concluded that diverse ensemble of fairly simple models can reach performance comparable to sophisticated state-of-the-art models. It is also concluded that due to the idiosyncrasies between datasets, knowing a priori which models work best is very difficult, and consequently ensembling can help mitigate risk of choosing a poor model for a new dataset.

All the references as recited in the disclosure are incorporated by their entireties. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

REFERENCES

Cicero Nogueira dos Santos and Bianca Zadrozny. 2014. Learning character-level representations for part-of-speech tagging. *Proceedings of the 31st International Conference on Machine Learning (ICML-14)*, pages 1818-1826.

Dzmitry Bandanau, Kyunghyun Cho, and Yoshua Bengio. 2015. Neural machine translation by jointly learning to align and translate. *ICLR*

Yoshua Bengio, Patrice Simard, and Paolo Frasconi. 1994. Learning long-term dependencies with gradient descent is difficult. *IEEE Transactions on Neural Networks* 5(2): 157-166.

Arjun Bhardwaj and Alexander Rudnicky. 2017. User intent classification using memory networks: A comparative analysis for a limited data scenario. *CoRR*

Aditya Bhargava, Asli Celikyilmaz, Dilek Hakkani-T¨ur, and Ruhi Sarikaya. 2013. Easy contextual intent prediction and slot detection. 2013 *IEEE International Conference on Acoustics, Speech and Signal Processing* pages 8337-8341.

KyungHyun Cho, Bart van Merrienboer, Dzmitry Bandanau, and Yoshua Bengio. 2014. On the properties of neural machine translation: Encoder-decoder approaches. *Association for Computational Linguistics* pages 103-111.

Ronan Collobert and Jason Weston. 2008. A unified architecture for natural language processing: Deep neural networks with multitask learning. *Proceedings of the 25th international conference on Machine learning* pages 160-167.

Daniel Guo, Gokhan Tur, Wen tau Yih, and Geoffrey Zweig. 2014. Joint semantic utterance classification and slot filling with recursive neural networks. 2014 *IEEE Spoken Language Technology Workshop (SLT)* pages 554-559.

Homa Hashemi, Amir Asiaee, and Reiner Kraft. 2016. Query intent detection using convolutional neural networks. *International Conference on Web Search and Data Mining, Workshop on Query Understanding*.

Sepp Hochreiter and Jurgen Schmidhuber. 1997. Long short-term memory. *Neural Computation* 9(8): 1735-1780.

Yoon Kim. 2014. Convolutional neural networks for sentence classification. EMNLP pages 1746-1751.

Yann LeCun and Yoshua Bengio. 1995. Convolutional networks for images, speech, and time-series. *The handbook of brain theory and neural networks* 3361(10).

Bing Liu and Ian Lane. 2016. Attention-based recurrent neural network models for joint intent detection and slot filling. *Interspeech* 2016 abs/1609.01454.

Chenyu Lu. 2017. Team report of deepbrain: A self-inhibiting residual convolution block based approach for text classification. *SMP-ECDT*

Tomas Mikolov, Martin Karafi'at, Lukas Burget, Jan Cernock'y, and Sanjeev Khudanpur. 2010. Recurrent neural network based language model. *Proceedings of the 11th Annual Conference of the International Speech Communication Association, INTERSPEECH* 2010 2:1045-1048.

Michael Neumann and Ngoc Thang Vu. 2017. Attentive convolutional neural network based speech emotion recognition: A study on the impact of input features, signal length, and acted speech.

Bruno Olshausen, Charles Anderson, and David Van Essenla. 1993. A neurobiological model of visual attention and invariant pattern recognition based on dynamic routing of information. *The Journal of Neuroscience* 13(11):4700-4719.

Patti Price. 1990. Evaluation of spoken language systems: The atis domain. *Proceedings of the Workshop on Speech and Natural Language* pages 91-95.

Hemant Purohit, Guozhu Dong, Valerie Shalin, Krishnaprasad Thirunarayan, and Amit Sheth. 2015. Intent classification of short-text on social media. *SocialCom 2015: 8th IEEE International Conference on Social Computing and Networking* pages 222-228.

Suman Ravuri and Andreas Stolcke. 2015. Recurrent neural network and lstm models for lexical utterance classification. *ISCA—International Speech Communication Association* pages 135-139.

Lior Rokach. 2010. Ensemble-based classifiers. *Artificial Intelligence Review* 33:1-39.

Erik Sang, Kim Tjong, and Jorn Veenstra. 1999. Representing text chunks. *Proceedings of the Ninth Conference on European Chapter of the Association for Computational Linguistics* pages 173-179.

Mike Schuster, Kuldip K. Paliwal, and A. General. 1997. Bidirectional recurrent neural networks. *IEEE Transactions on Signal Processing*

Imran Sheikh, Irina Illina, Dominique Fohr, and Georges Linares. 2016. Learning word importance with the neural bag-of-words model. *Proceedings of ACL* 2016

Yangyang Shi, Kaisheng Yao, Le Tian, and Daxin Jiang. 2016. Deep lstm based feature mapping for query classification. *HLT-NAACL*

Richard Socher, Brody Huval, Christopher Manning, and Andrew Ng. 2012. Semantic compositionality through recursive matrix-vector spaces. *Proceedings of the 2012 joint conference on empirical methods in natural language processing and computational natural language learning* pages 1201-1211.

Yaoru Sun and Robert Fisher. 2003. Objectbased visual attention for computer vision. *Artificial Intelligence* 146 (2003):77-123.

Ilya Sutskever, James Martens, and Geoffrey Hinton. 2011. Generating text with recurrent neural networks. *Proceedings of the 28th International Conference on Machine Learning* (ICML-11) pages 1017-1024.

Jiecong Tang, Yongshi Liang, jiangyue Yan, Yanghui Li, Dawei Ling, Zhen Zeng, Zefeng Du, and Peijie Huang. 2017. Team report of scau sigsds on the closed task of intent classification for the evaluation of Chinese human computer dialogue technology. *SMP-ECDT*

Gokhan Tur, Dilek Hakkani-T" ur, and Larry Heck. 2010. What is left to be understood in atis? 2010 *IEEE Spoken Language Technology Workshop* pages 19-24.

Ngoc Thang Vu. 2016. Sequential convolutional neural networks for slot filling in spoken language understanding. *CoRR arXiv: 1606.07783v1*.

Puyang Xu and Ruhi Sarikaya. 2013. Convolutional neural network based triangular crf for joint intent detection and slot filling. *Automatic Speech Recognition and Understanding (ASRU), 2013 IEEE Workshop on* pages 78-83.

Wenpeng Yin, Hinrich Schutze, Bing Xiang, and Bowen Zhou. 2016. Abcnn: Attention-based convolutional neural network for modeling sentence pairs.

Weinan Zhang, Zhigang Chen, Wanxiang Che, Guoping Hu, and Ting Liu. 2017. The first evaluation of chinese human-computer dialogue technology. *CoRR abs/1709.10217*.

Xiaodong Zhang and Houfeng Wang. 2016. A joint model of intent determination and slot filling for spoken language understanding. *Proceedings of the Twenty-Fifth International Joint Conference on Artificial Intelligence* pages 2993-2999.

The invention claimed is:

1. A computer-implemented method for determining an intent class of an input text, comprising:
   providing a plurality of trained model sets, wherein each of the plurality of trained model sets is based on a different model and comprises a plurality of trained models, wherein each of the plurality trained models in the each of the plurality of trained model sets is obtained by training a same model with a different initialization condition over a pre-determined dataset;
   feeding the input text into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

ensembling prediction results corresponding to a same trained model set for each of the plurality of trained model sets to thereby obtain a plurality of first-layer ensembles corresponding respectively to the plurality of trained model sets;

ensembling the plurality of first-layer ensembles to thereby obtain at least one second-layer ensemble, wherein each of the at least one second-layer ensemble is obtained by ensembling two or more of the plurality of first-layer ensembles; and determining the intent class of the input text based on the at least one second-layer ensemble;

the method further comprising:

evaluating each of the plurality of first-layer ensembles and each of the plurality of second-layer ensembles using pre-determined labels from a test set of the pre-determined dataset; and comparing a metric corresponding to each of the plurality of first-layer ensembles and each of the plurality of second-layer ensembles, and identifying the one or the combination of the models for the intent classification method if the one or the combination of the models implicated in one of the plurality of first-layer ensembles or the plurality of second-layer ensembles has a most favorable metric compared with others.

2. The computer-implemented method of claim 1, wherein the providing a plurality of trained model sets comprises:

providing a plurality of models; and training each of the plurality of models using data from the pre-determined dataset to thereby obtain the plurality of trained model sets.

3. The computer-implemented method of claim 2, wherein the plurality of models comprise at least one neural networks-based model.

4. The computer-implemented method of claim 3, wherein each trained model in each trained model set that is based on a neural networks-based model is trained with different random initializations of weights.

5. The computer-implemented method of claim 3, wherein the at least one neural networks-based model comprises one or more convolutional neural networks-based models, each selected from CNN, CharCNN, ABiCNN, or ACharBiCNN.

6. The computer-implemented method of claim 5, wherein the one or more convolutional neural networks-based models comprises ABiCNN.

7. The computer-implemented method of claim 3, wherein the at least one neural networks-based model comprises one or more recurrent neural networks-based models, each selected from GRU, CharGRU, BiGRU, and CharBiGRU, LSTM, CharLSTM, BiLSTM, or CharBiLSTM.

8. The computer-implemented method of claim 3, wherein the at least one neural networks-based model comprises at least one convolutional neural networks-based model and at least one recurrent neural networks-based model.

9. The computer-implemented method of claim 3, wherein the pre-determined dataset is specific to a language whose characters contain rich semantic information, wherein each of the at least one neural networks-based model has character-level embeddings.

10. The computer-implemented method of claim 2, wherein the pre-determined dataset is ATIS, and the plurality of models comprise GRU, BiGRU, BiLSTM, CNN, CharCNN, ABiCNN, and ACharBiCNN.

11. The computer-implemented method of claim 2, wherein the pre-determined dataset is Banking, and the plurality of models comprise CharGRU, CharLSTM, CharBiGRU, CharBiLSTM, CNN, CharCNN, ABiCNN, and ACharBiCNN.

12. The computer-implemented method of claim 2, wherein the pre-determined dataset is SMP, and the plurality of models comprise CharLSTM, CharBiGRU, CharBiLSTM, CharCNN, ABiCNN, and ACharBiCNN.

13. The computer-implemented method of claim 1, wherein one or both of the ensembling prediction results corresponding to a same trained model set for each of the plurality of trained model sets to thereby obtain a plurality of first-layer ensembles corresponding respectively to the plurality of trained model sets and the ensembling the plurality of first-layer ensembles to thereby obtain at least one second-layer ensemble, wherein each of the at least one second-layer ensemble is obtained by ensembling two or more of the plurality of first-layer ensembles is performed under a majority vote with confidence approach.

14. A system for determining an intent class of an input text, comprising:

a computer-readable memory storing executable instructions; and one or more processors in communication with the computer-readable memory, wherein the one or more processors are programmed by the executable instructions to at least:

feed the input text into each of a plurality trained models in each of a plurality of trained model sets to thereby calculate a plurality of prediction results, each indicating a likely intent class of the input text, wherein the plurality of prediction results correspond respectively to the plurality of trained models in the each of the plurality of trained model sets;

ensemble prediction results corresponding to a same trained model set for each of the plurality of trained model sets to thereby obtain a plurality of first-layer ensembles corresponding respectively to the plurality of trained model sets; and ensemble the plurality of first-layer ensembles to thereby obtain at least one second-layer ensemble, wherein each of the at least one second-layer ensemble is obtained by ensembling two or more of the plurality of first-layer ensembles;

wherein the one or more processors are further configured to:

evaluate each of the plurality of first-layer ensembles and each of the plurality of second-layer ensembles using pre-determined labels from a test set of the pre-determined dataset; and compare a metric corresponding to each of the plurality of first-layer ensembles and each of the plurality of second-layer ensembles, and identifying the one or the combination of the models for the intent classification method if the one or the combination of the models implicated in one of the plurality of first-layer ensembles or the plurality of second-layer ensembles has a most favorable metric compared with others.

15. The system of claim 14, wherein the one or more processors are programmed by the executable instructions to further:

train each of a plurality of models using data from a pre-determined dataset to thereby obtain the plurality of trained model sets, wherein each of the plurality of trained model sets is based on a different model, and each of the plurality trained models in the each of the plurality of trained model sets is based on a same model with a different initialization condition.

16. The system of claim 15, wherein each of the plurality of models is a neural networks-based model, and the different initialization condition comprises different random initialization of weights.

17. The system of claim 16, wherein the neural networks-based model is a convolutional neural networks-based model or a recurrent neural networks-based model.

18. The system of claim 15, wherein the one or more processors are programmed by the executable instructions to further:

convert an input data into the input text.

19. A computer-implemented process for identifying one or a combination of models for an intent classification method with favorable accuracy based on a dataset, comprising:

providing a plurality of models;

training each of the plurality of models using data from a train set of the dataset to thereby obtain a plurality of trained model sets, wherein each of the plurality of trained model sets is based on a different model and comprises a plurality of trained models, wherein each of the plurality trained models in the each of the plurality of trained model sets is obtained by training a same model with a different initialization condition over the dataset;

feeding an input text in a test set of the dataset into each of the plurality trained models in the each of the plurality of trained model sets to thereby obtain a plurality of prediction results, each indicating a likely intent class of the input text, wherein the plurality of prediction results correspond respectively to the plurality of trained models in each of the plurality of trained model sets;

ensembling prediction results corresponding to a same trained model set for each of the plurality of trained model sets to thereby obtain a plurality of first-layer ensembles corresponding respectively to the plurality of trained model sets;

ensembling the plurality of first-layer ensembles to thereby obtain a plurality of second-layer ensembles, wherein each of the plurality of second-layer ensembles is obtained by ensembling one of all possible combinations among the plurality of first-layer ensembles;

evaluating each of the plurality of first-layer ensembles and each of the plurality of second-layer ensembles using pre-determined labels from the test set; and comparing a metric corresponding to each of the plurality of first-layer ensembles and each of the plurality of second-layer ensembles, and identifying the one or the combination of the models for the intent classification method if the one or the combination of the models implicated in one of the plurality of first-layer ensembles or the plurality of second-layer ensembles has a most favorable metric compared with others.

20. The computer-implemented process of claim 19, wherein the metric comprises an unweighted F1 score.

* * * * *